United States Patent
Antolovic et al.

(10) Patent No.: US 8,670,802 B2
(45) Date of Patent: Mar. 11, 2014

(54) WIRELESS NETWORK RADIOLOCATION APPARATUSES, SYSTEMS AND METHODS

(76) Inventors: Danko Antolovic, Bloomington, IN (US); Steven Wallace, Bloomington, IN (US)

(*) Notice: Subject to any disclaimer, the term of this patent is extended or adjusted under 35 U.S.C. 154(b) by 1009 days.

(21) Appl. No.: 12/225,989

(22) PCT Filed: Apr. 5, 2007

(86) PCT No.: PCT/US2007/066084
§ 371 (c)(1),
(2), (4) Date: Oct. 3, 2008

(87) PCT Pub. No.: WO2007/118161
PCT Pub. Date: Oct. 18, 2007

(65) Prior Publication Data
US 2009/0054106 A1    Feb. 26, 2009

Related U.S. Application Data

(60) Provisional application No. 60/789,244, filed on Apr. 5, 2006.

(51) Int. Cl.
*H04M 1/00* (2006.01)
(52) U.S. Cl.
USPC .................. 455/562.1; 455/575.7

(58) Field of Classification Search
USPC .............. 455/575.7, 562.1, 19, 25
See application file for complete search history.

(56) References Cited

U.S. PATENT DOCUMENTS

| | | |
|---|---|---|
| 5,774,087 A | 6/1998 | Rose |
| 6,070,079 A * | 5/2000 | Kuwahara ............ 455/456.2 |
| 6,337,754 B1 * | 1/2002 | Imajo ................... 398/115 |
| 6,480,706 B1 * | 11/2002 | Mimura et al. ........ 455/140 |
| 6,922,170 B2 | 7/2005 | Alexander, Jr. |
| 7,117,016 B2 * | 10/2006 | Kisigami et al. ...... 455/562.1 |
| 7,136,624 B2 * | 11/2006 | Ofuji et al. ........... 455/63.4 |
| 7,260,369 B2 | 8/2007 | Feher |
| 7,342,536 B2 | 3/2008 | Johnson |
| 7,403,508 B1 * | 7/2008 | Miao ..................... 370/335 |
| 2003/0157943 A1 * | 8/2003 | Sabat, Jr. .............. 455/456 |
| 2003/0199258 A1 | 10/2003 | Matsuki et al. |
| 2004/0110514 A1 * | 6/2004 | Kim et al. ............. 455/456.1 |
| 2004/0127230 A1 | 7/2004 | Bevan et al. |
| 2004/0157613 A1 * | 8/2004 | Steer et al. ............ 455/446 |
| 2005/0266799 A1 * | 12/2005 | Hara et al. ............ 455/562.1 |
| 2006/0025178 A1 | 2/2006 | Tao et al. |
| 2006/0217158 A1 * | 9/2006 | Uwano et al. ......... 455/562.1 |

* cited by examiner

*Primary Examiner* — Ajit Patel
(74) *Attorney, Agent, or Firm* — Liell & McNeil

(57) ABSTRACT

An apparatus including an array of directional antenna elements is provided. The apparatus is configured to identify an angular relationship between a transmitting device and the apparatus by sampling data from antenna elements and analyzing reception patterns relating to antenna elements.

23 Claims, 21 Drawing Sheets

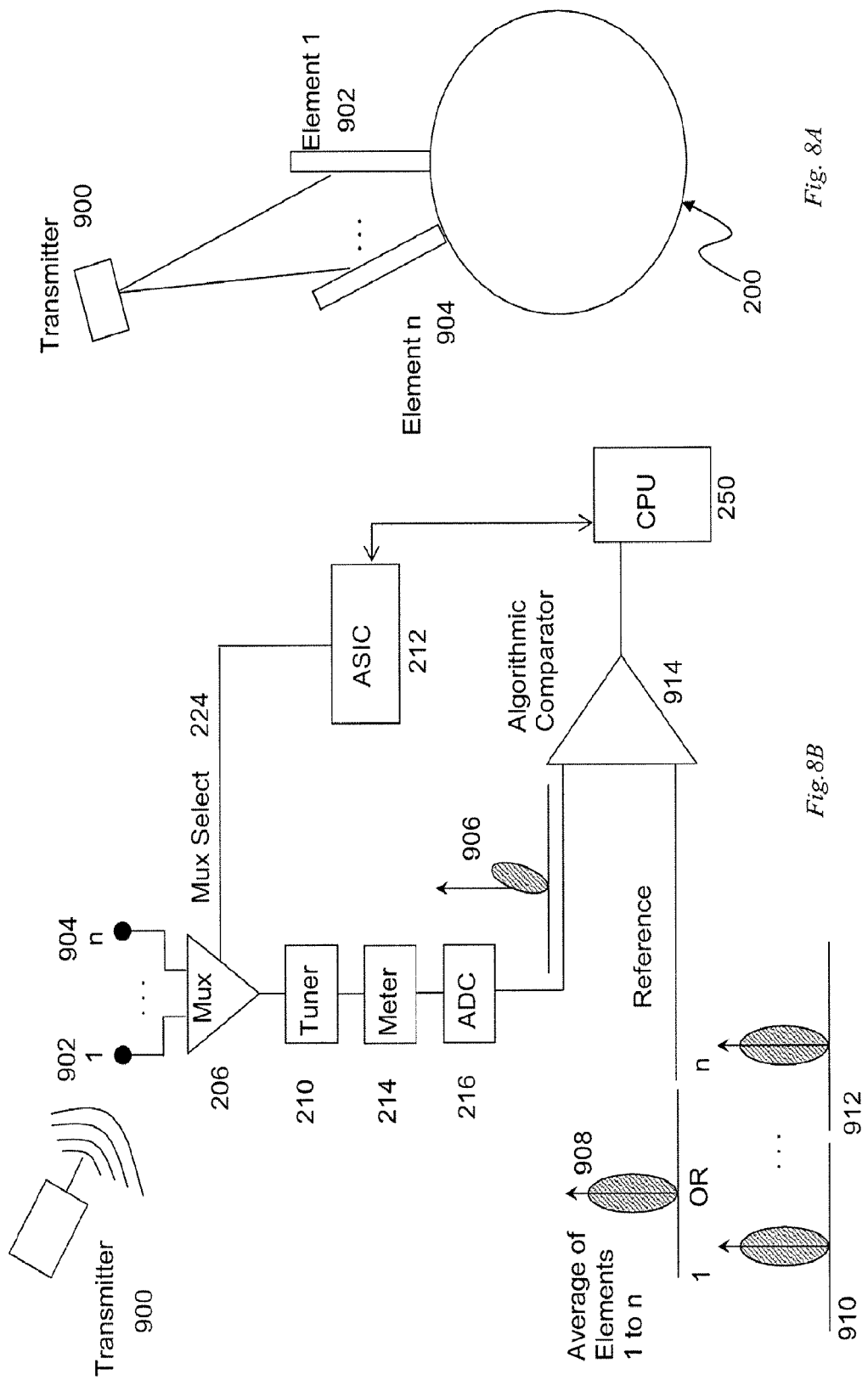

WIRELESS NETWORK RADIOLOCATION APPARATUSES, SYSTEMS AND METHODS

RELATED APPLICATIONS

This application claims the benefit of U.S. Provisional Patent Application No. 60/789,244, filed Apr. 5, 2006, incorporated herein by reference.

STATEMENT REGARDING GOVERNMENT SUPPORT

Some parts of the invention disclosed herein were made with government support under grant reference number ANI 0129592 awarded by the National Science Foundation. The Government may have certain rights in this invention.

BACKGROUND

Radio transmission differs most significantly from wired signaling in its (almost universal) omnidirectionality. Of course, decoupling communication from the localized infrastructure of cables is precisely what drives wireless networks and which make these an economic success story. However, the absence of a physical other end of the wire is one factor which makes the management of wireless networks difficult. A network manager typically cannot physically locate a trouble-spot or other transmission source in the network.

Wireless networks offer advantageous solutions for allowing communication between two or more computers or other electronic devices (for example, PDAs, tracking devices, inventory devices and other so-called handheld devices) using a networking protocol without requiring a physical link between computers or other networked devices. Two examples of a wireless network protocol are the so-called Wi-Fi and WiMAX standards formally known as the 802.11 and 802.16 standards adopted by the Institute of Electrical and Electronics Engineers (IEEE). The IEEE and other organizations have adopted, proposed, discussed, and debated various other wireless networking specifications, such as other in the 802.11 family including the 802.11, 802.11a, and 802.11g standards. Furthermore, there are many other approaches to wireless networking which have not been adopted or implemented as formal standards, or which were implemented or adopted at one time but have now been superseded. In theory, there are a virtually limitless number of configurations, protocols, and standards for wireless networks.

Wireless networks present a number of network management, identification, location, and security challenges which can benefit from the ability to locate sources interacting with a wireless network. Many problems in wireless networking stem from the fact that users and their equipment are mobile within a given network range and from time to time enter and exit wireless networks. Thus, unlike devices attached to wired networks, a user's location is often unknown and difficult, if not impossible, to determine using current technology. This makes traditional network management and security approaches ineffective. Thus, at present, Wi-Fi has become nearly ubiquitous, yet the managers of Wi-Fi networks lacks adequate apparatuses, systems, and methods for effective, let alone optimal, management.

Wi-Fi operates in an unlicensed band, shared with industrial equipment and other non-communicating devices. Furthermore, the applicable Federal Communications Commission's rules (FCC Part 15) do not require any coordination among Wi-Fi users or uses. Unlike, for example, cell phones, Wi-Fi devices are often configurable by the end user, which allows anyone to set up ad-hoc networking structures, even in disregard of any existing institutional network regulations, or, for that matter, the intention, wishes, rules, or regulation of anyone else. Naturally, this opens the door to accidental and intentional disruption of communication and myriad other problems and obstacles to optimal wireless network operation.

In addition, radio communication is by its nature spatially distributed. Mere detection of a network ID (such as an IP address) in a wireless network does not reveal the location of an interlocutor, an authorized user, or a user of undetermined status which makes it difficult for a network manager to even physically locate a user or a possible trouble spot in the network.

Also, a consequence of the omnidirectional wireless transmission is that the signal strength generally drops off very rapidly with distance. The intended receiver typically receives a minuscule fraction of the energy of the transmission, and considerable engineering effort goes into recovering the signal from that low energy level. Virtually all of the transmitter's power is wasted, and worse the message to the intended receiver is simultaneously an interference which prevents communication between all other network agents in that band, within the receiving range.

The problem of radio signal drop-off can be alleviated with high-gain dish antennas, but the technique applies only to communication between fixed points, and is scarcely usable in the light-weight, ad-hoc, mobile world of the Wi-Fi. Relatively crude hand-held yagi direction finders and power meters could be used as Wi-Fi management tools, but there is little by way of versatile Wi-Fi management tools operating in the physical layer. For example, the single physical-layer diagnostic tool that is commonly supplied with Wi-Fi devices today, reporting of the signal strength, is crude and inaccurate.

An example illustrating the need for radiolocation of clients in a wireless network is as follows. Currently Internet Protocol or IP addresses are assigned by network servers. A common difficulty with wireless networks is that multiple clients (e.g., devices that can communicate wirelessly) may be assigned the same IP address. When two clients are communicating with a server using the same IP address, this situation results in one client being disconnected from the network.

While several approaches to locating sources in a wireless network have been attempted, there is still a need for an efficient, accurate and reliable solution. One existing approach relies on algorithmic analysis of the traffic to and from multiple network agents. For example, software systems can be "trained" to correlate the location of a source with received signal strengths (RSS) at multiple receivers in a known environment, such as an office suite. This approach requires dense coverage with receivers, and the system would need to be specifically trained for the environment at each deployment site. If the physical environment were to change (for example, if a new wall were built or a new user were to enter the system), the system would need to be re-trained.

Another known approach involves use of techniques similar to those of Global Positioning Systems (GPS). This approach determines the distance of a receiver from multiple network nodes, by measuring the signal times-of-arrival (TOAs). This approach is problematic in the wireless network context, since, unlike a GPS system, the distances in the wireless network applications are much smaller (and the transmission times much shorter). Thus, there could be significant technical difficulties in accurately measuring such short time intervals in wireless networks.

Another known approach includes measuring the slightly different times at which a single wavefront arrives at multiple elements of a compound antenna. These elements could be in a fixed spatial arrangement, and thus can be referred to as a phased array. This method can yield the angular direction of the incoming signal, using techniques similar to those of phased-array radars and large-scale radio astronomy. To an even greater degree than TOA, phased arrays would require accurate measurements of very short time intervals (on the order of pico-seconds, for realistic Wi-Fi receiver sizes). Thus, there would be significant technical difficulties in accurately measuring such short time intervals in a wireless network.

As a result, wireless networks are as a rule poorly managed, and network administrators find it difficult to provide a consistent quality of service to the users. Yet for these very same reasons, Wi-Fi is a commercial success, with sales volumes sufficient to bring the cost of individual devices down into the range of tens of dollars. Low cost of the equipment, absence of physical infrastructure (wiring), and the do-it-yourself unregulated nature of the communication, allow easy entry to new users. Hospitals, delivery services, police and others all make use of Wi-Fi as an integral part of their business and operations process. Thus, there is a clear benefit to developing better management tools, processes and knowledge in the Wi-Fi arena.

SUMMARY

One embodiment according to the present invention provides a radiolocation device that can determine the spatial direction from which every individual data packet transmitted in the Wi-Fi network has arrived, at a speed equal to the rate of wireless traffic.

One or more embodiments according to the present invention include the following features present together in one device: (a) a compound antenna, which is stationary, and localized (single device, not distributed over a wide area), (b) the antenna units in this antenna are directional, and their directional ranges together cover a domain of directions around the compound antenna (for example, a full circle, part of a circle, all directions in space), (c) as a transmission packet reaches the compound antenna, signals from all antennal units are sampled sequentially (multiplexed in time), (d) the sampling is completed within the duration of the reception of one packet, (e) sampled signals are used to determine the direction about the antenna of the received packet. Because of point (d) the direction can be determined for every individual packet. This is desirable because it allows the apparatus to determine (by triangulation) the location of a wireless source even if that source transmits very few packets, as for example a hostile intruder may wish to do.

In another embodiment according to the present invention, an apparatus is provided, which includes a compound antenna array having a plurality of directional antennas extending from a central structure. The apparatus further includes an RF multiplexer electrically coupled to the plurality of directional antennas and operable to output multiplexed information indicating the power level of at least one packetized wireless network signal received by at least some of the directional antennas. The apparatus also includes an analyzer for determining information indicating a transmission direction about the compound antenna from which the packetized wireless network signal originated. During normal operation the apparatus receives many packets and detects the power levels and determines direction of each received packet.

In a further embodiment the above mentioned apparatus has an antenna array which includes sixteen directional antennas. In this embodiment the central structure includes two octagonal structures positioned adjacent one another and offset relative to one another, and each of the directional antennas extend substantially perpendicular to one of faces of one of the octagonal structures.

In another embodiment the above mentioned apparatus includes an RF circuit board used for the RF multiplexer which has four layers: a) RF signals and reference, b) RF reference, c) digital ground plane, and d) digital control signals.

In still another embodiment the apparatus includes a timing and control unit coupled to the RF multiplexer and to an analog to digital converter, and also includes a receiver adapted to receive an output of the RF multiplexer and a power meter adapted to receive an output of the receiver and to output information to the analog to digital converter.

Another embodiment according to the present invention is a system which includes at least two apparatuses substantially similar to one of the apparatuses described above and further including software operable to determine a source location from which the wireless network signal originated based upon a triangulation utilizing information of the angular location of the source about the first apparatus and information of the angular location of the source about the second apparatus and information relating to the relative positioning of the two apparatuses.

Another embodiment according to the present invention includes circuitry including an RF multiplexer having a plurality of RF inputs each adapted to be couplable to one of a plurality of directional antennas positioned at intervals about a detection range. The circuitry also includes a filter block adapted to receive an output of the multiplexer, a receiver block adapted to receive an output of the filter, a power sensing block adapted to receive an output of the receiver, and an analog to digital conversion block adapted to receive an output of the power sensing block.

In a further embodiment according to the present invention, the filter block, the receiver block and the power sensing block, and the analog to digital converter block are implemented in an integrated circuit chipset.

Another embodiment includes a computer or processor adapted to receive an output from the analog to digital converter and programmed to process that output to determine a direction from which at least one network packet was received relative to a first antenna array. The processor may be a microcontroller or microprocessor.

In an additional embodiment the computer or processor is coupled to receive the output of a second analog to digital converter and is and programmed to process that output to determine a direction from which at least one network transmission packet was received relative to a second antenna array, and the computer or processor is programmed to determine a location of the source of the network packet.

In a further embodiment the determining location is based upon a single wireless network transmission packet or a portion of a packet, such as a header or preamble. In an additional embodiment the determining location is based upon multiple wireless network transmission packets.

Still another embodiment according to the present invention is a method including receiving a wireless network transmission packet at least one of the antennal units of a compound antenna. The method also includes multiplexing information of the signal received by the antenna units to an output, processing the output to determine information of the power received by each of the antenna units, and determining a first angular position about the compound antenna based upon the power information.

Another embodiment includes receiving a network transmission packet at least one of the antennal units of a second compound antenna, multiplexing information of the signal received by the second antenna units to a second output, processing the second output to determine information of the power received by each of the second antenna units, and determining an second angular position about the second compound antenna based upon the second power information.

A further embodiment includes determining the location of a source transmitting to a wireless network receiver based upon the first angular position and the second angular position. In one embodiment the multiplexing is time-based multiplexing. In other embodiments parallel processing of the antenna signals could be used.

An additional embodiment according to the present invention includes determining the location of an unauthorized transmitter to a wireless network utilizing one of the apparatuses, systems, or methods described above.

Another embodiment includes determining the location of an authorized transmitter to a wireless network utilizing one of the apparatuses, systems, or methods described above and further includes communicating to the authorized transmitter using a wireless network transmitter determined to be best or suitably positioned for transmission to the authorized user based upon the location of the authorized user.

In certain embodiments, the compound antenna array and/or directional antenna elements are substantially stationary, non-rotating, or fixed. The directional antennas are configured to have overlapping angular ranges in some embodiments. The detection ranges may be predetermined. In the illustrated embodiments, these overlapping angular ranges cover 360 degrees.

In the illustrated embodiments, the directional antennas are configured to have a reception pattern or lobe tilted in a direction of a transmission direction of a source of a wireless signal.

In the illustrated embodiments, the RF multiplexer is configured to sequentially sample a signal received by a plurality of the directional antennas within the time of reception of the wireless signal by the compound antenna. In the illustrated embodiments, the analyzer is configured to determine the transmission direction based on the power level of the wireless signal. In the illustrated embodiments, the analyzer is further configured to determine the transmission direction using at least one lobe pattern relating to the directional antennas.

In certain embodiments, each directional antenna has a reception pattern. The reception pattern may be predetermined or learned. The RF multiplexer may be configured to output multiplexed information indicating a signal strength of at least one segment of a wireless signal received by at least some of the directional antennas. The analyzer may be configured to determine information indicating a transmission direction from which the wireless signal originated using the signal strength information and reception pattern information relating to the directional antennas.

An additional embodiment includes tracking the movement of a transmitter to a wireless network by successively repeating one of the methods described above.

Radiolocation apparatus, methods and systems according to the present invention can detect the location of problem nodes on the network, even if they generate sparse traffic. Also, the directional information about clients and access points can be used to guide a directional response to every interlocutor individually, using the same array of directional elements that is used for radiolocation.

The foregoing are illustrative and non-limiting examples of several embodiments according to the present invention. Additional embodiments, aspects, objects, and advantages of the present invention will be apparent from the following description.

BRIEF DESCRIPTION OF THE DRAWINGS

FIG. 8A is a schematic of a system according to an embodiment of the present invention;

FIG. 8B is a block diagram including major circuit blocks according to the embodiment of FIG. 8A;

DETAILED DESCRIPTION

The following description will focus on an 802.11b compatible embodiment. To be clear, however, the invention is not limited to devices compatible with the 802.11b standard, and can be used with essentially any wireless network, for example, networks according to other standards in the 802.11 and 802.16 families including the 802.11, 802.11a, and 802.11g standards, and other wireless networks, such as GSM. The specific circuitry, structure, components, and features described for the 802.11b standard could vary for different embodiments for different wireless networks. Integrating radiolocation devices according to the present invention (regardless of the particular system used) with wireless network equipment can improve the diagnostics and security management of wireless networks. It can also provide a foundation for better connectivity and a more rational and efficient usage of wireless radio bands.

Figure 1:
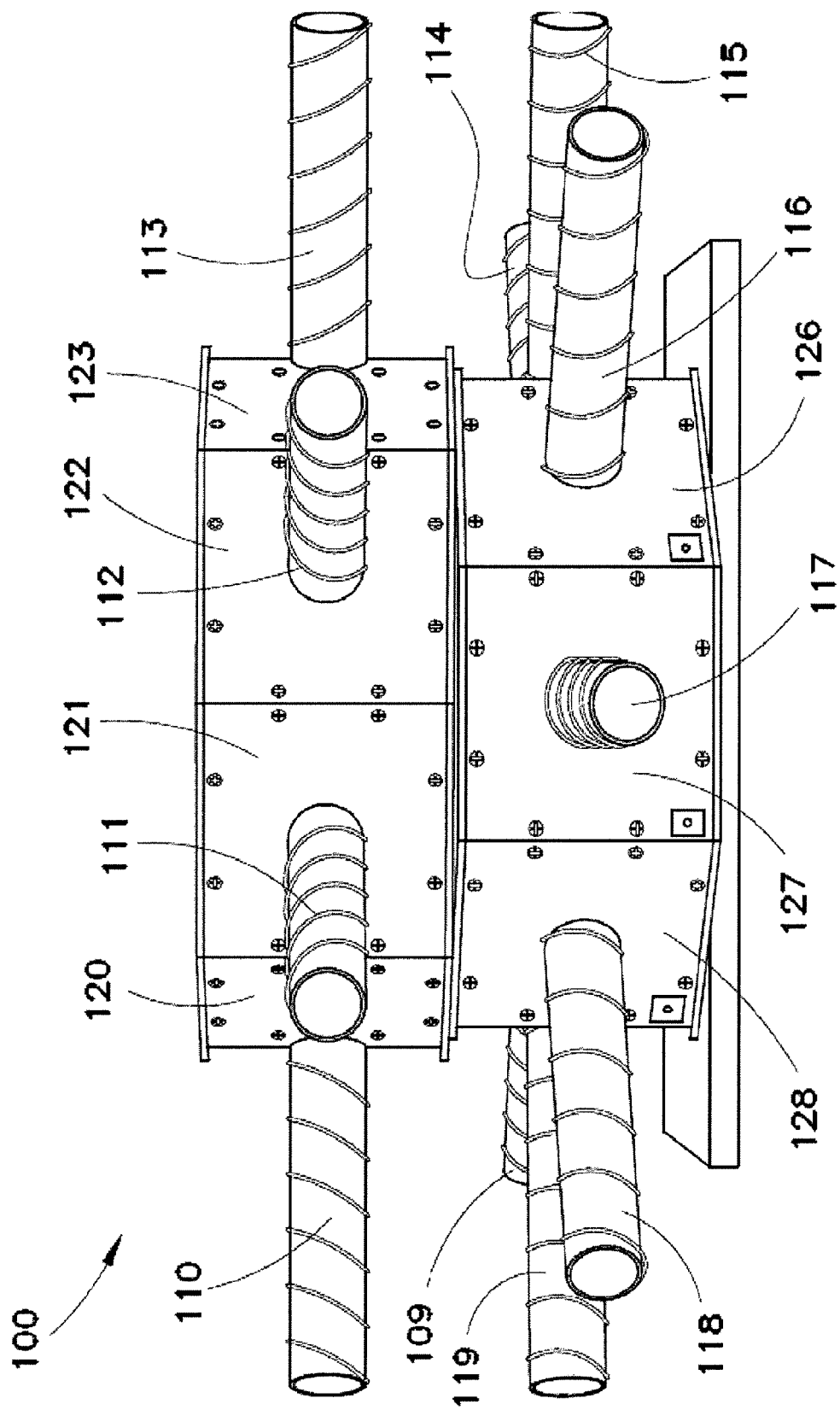
FIG. 1 is a side perspective view of a compound directional antenna array according to one embodiment of the present invention.

With reference to FIG. 1 there is shown a compound directional antenna array 100 according to one embodiment of the present invention. Array 100 includes two groups of helical directional antenna elements labeled 109, 110, 111, 112, 113, 114, 115, 116, 117, 118, 119, and several others that are not visible in FIG. 1. The antenna elements protrude out from ground planes 120, 121, 122, 126, 127, and 128 and several others that are not visible in FIG. 1. The embodiment illustrated in FIG. 1 includes a total of 16 helical directional antenna elements protruding out from the faces of two octagonal ground plane structures that are positioned on top of one another and offset to stagger the upper and lower protruding antenna elements. All of the ground planes are conductively coupled to one another.

In the illustrated embodiment, all portions of the antenna array 100 are configured to be substantially non-rotating, stationary, or fixed. Also in the illustrated embodiment, each of the directional antenna elements are positioned substantially equidistant from one another at an angle determined by dividing the number of antenna elements by 360 degrees.

It should be understood that a variety of other substantially non-rotating directional antenna arrays could be used. For example, greater or fewer than sixteen directional antenna elements could be used. Furthermore, other types of substantially non-rotating directional antenna elements could also be used, and could be adapted to a variety of operating frequencies of different wireless networks.

Additionally, different shapes and configurations of ground plane and support structures could be used. The substantially non-rotating directional antenna array need only provide a plurality of directional antenna structures having maximum signal reception in different directions over a desired detection range which, in the illustrated embodiment is 360 degrees. Furthermore, a variety of refinements and modifications appropriate for commercial embodiments according to the present invention could be made to the embodiment illustrated in FIG. 1 while still falling within the scope of the present invention.

This is also true of the embodiments illustrated and described elsewhere herein. As an example, directional patch antennas may be used instead of helices or combinations of both or other antennas may also be used. Furthermore, arrangement of the antenna elements in two staggered octagons is not essential. For example, a single ring of 16 antennas would be functionally equivalent and could be positioned about a hexadecagon or a circle or in a variety of other configurations.

The dimensions of the compound antenna illustrated in FIG. 1 are adapted for use with an 802.11b compatible system and are as follows. The compound antenna is made up of two staggered substantially stationary arrangements of 8 directional antenna detectors each which point radially outwards. The rings are some 25-30 cm in diameter. Each detector is a helix, about 12 cm long, 3 cm in diameter, with a 12 cm diameter groundplane perpendicular to the helix. Each helix has six turns, is tuned for 2.4 GHZ, with 12 dBi gain, square backplanes about 12.5 cm on side, and matched to 50Ω impedance. This type of detector has a main lobe about 90 degrees wide, from null to null. Since the accuracy of the antenna dimensions affects the lobe shape and direction, care must be taken to build the antenna to proper engineering specifications.

Figure 2:
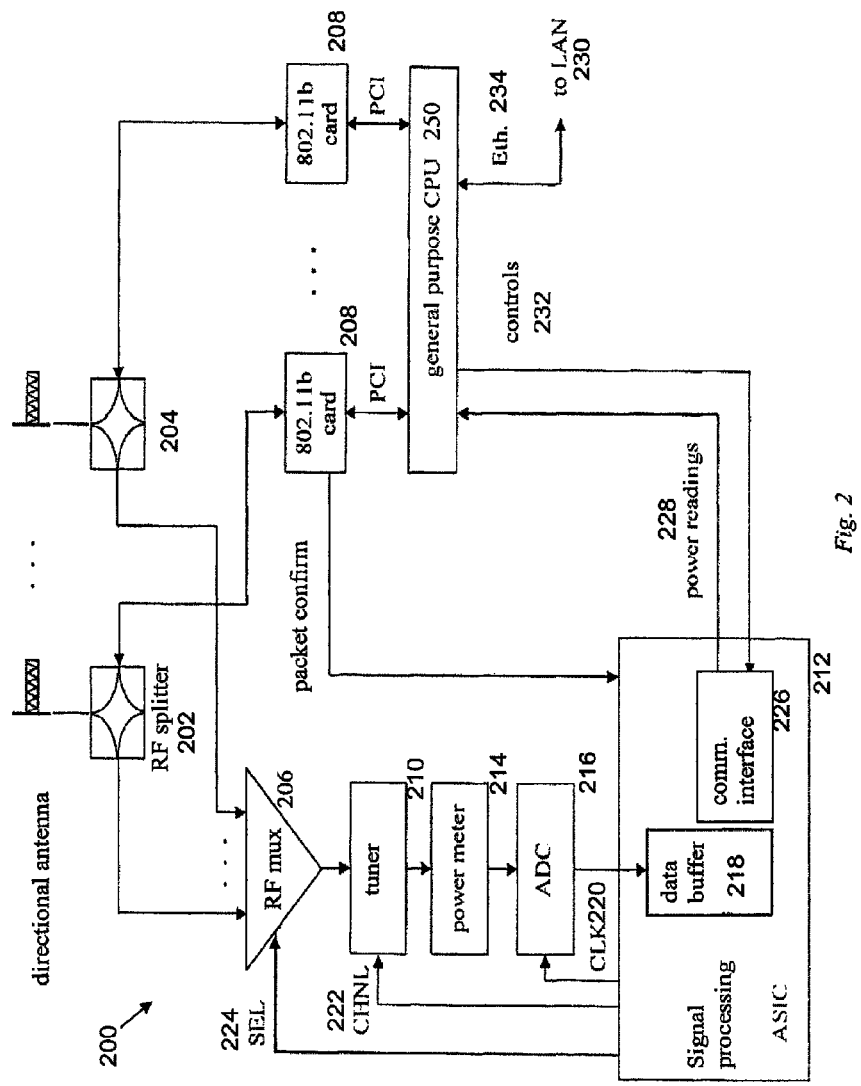
FIG. 2 is a schematic of circuitry according to one embodiment of the present invention.

With reference to FIG. 2 there is shown a block diagram of circuitry 200 according to one embodiment of the present invention. As Shown in FIG. 2, a number of directional antennas are coupled to RF splitters 202 and 204 which, in turn, are coupled to the inputs of RF multiplexer 206 and to a plurality of network cards (in this case 802.11b cards) 208 or other network interfaces or to a computer including an integrated interface. The network cards are coupled to and output their packet information to computer, CPU, or microprocessor 250 via PCI interfaces, and are also coupled to signal processing application specific integrated circuit or ASIC 210 to which they pass packet confirmation data. The output of RF multiplexer 206 is coupled to tuner/receiver 212 which is in turn coupled to power meter 214. Power meter 214 is coupled to analog to digital converter 216, which in turn outputs to signal processing ASIC 210. Signal processing ASIC 216 stores output from analog to digital converted 216 in data buffer 218, and outputs clock 220, channel 222 and selection signals 224 to analog to digital converter 216, tuner 212 and RF multiplexer 206, respectively. Signal Processing ASIC 216 also includes communication interface 226 which transmits power reading information 228 to computer, CPU, or microprocessor 250 and receives control signals 232 from same. The computer can also be linked to Ethernet or local area network 230, via Ethernet cables 234.

Radiolocation techniques according to the present invention include techniques of measuring the signal strength in multiple directions with a plurality of directional antennas. To eliminate the delay inherent in the physical motion of a conventional rotating dish antenna, an array of stationary directional elements whose ranges cover a full circle (or another detection range if less than a full circumference is desired to be measured) can be constructed. During the reception period of each packet, signals (or the lack thereof) from all the directional elements are sampled in rapid succession, or according to a time multiplexing scheme. Direction of the source is, thereby, reconstructed from individual signal strengths and the known reception patterns of the antenna elements.

The reception patterns of the antenna elements are predetermined. In the illustrated embodiment, they are established through a learning process. This learning process may be necessary only for design stages and avoided for production-level manufacturing, if the antenna array can be manufactured with sufficient quality. While a stationary transmitter is emitting a signal, the direction of the antenna array is advanced. In the case of the antenna array of FIG. 1, the array is advanced by 22.5 degrees, resulting in 16 iterations. For each angular iteration, a reception pattern for the antenna element facing the transmitter is recorded. Therefore, for the 16 iterations, 16 patterns are created, 1 for each angular position.

Where there are memory and processor constraints, patterns for each angular position may be analyzed (averaged, for example) to produce one or more representative patterns for the antenna elements. Alternatively, where memory and processing powers are not constraining, all 16 patterns may be recorded. In some circumstances the latter may produce more accurate results in determining the angular direction of a broadcasting source. Either way, after at the completion of the learning process, when a transmitter from any angular position is broadcasting, the reception patterns from the antenna elements are compared with the predetermined or learned reception patterns. When the system makes a match, according to an algorithm which will be discussed shortly, with one of the predetermined or learned reception patterns, the system determines the angular position of the broadcasting source.

The apparatuses, methods and a systems according to the present invention can be substantially immune to distortions due to attenuation along the propagation path, since the reception by every element of the array is affected equally. Such apparatuses, systems, and methods are also no more vulnerable to multipath signal propagation than other approaches. These apparatuses systems and methods give the ability to discern the direction (in real time) of a single wireless packet, and by triangulation the spatial location of its source. The determination of direction can also be based on more than one, however, the preferred embodiment is capable of determining direction based upon only one received packet.

Figure 3:
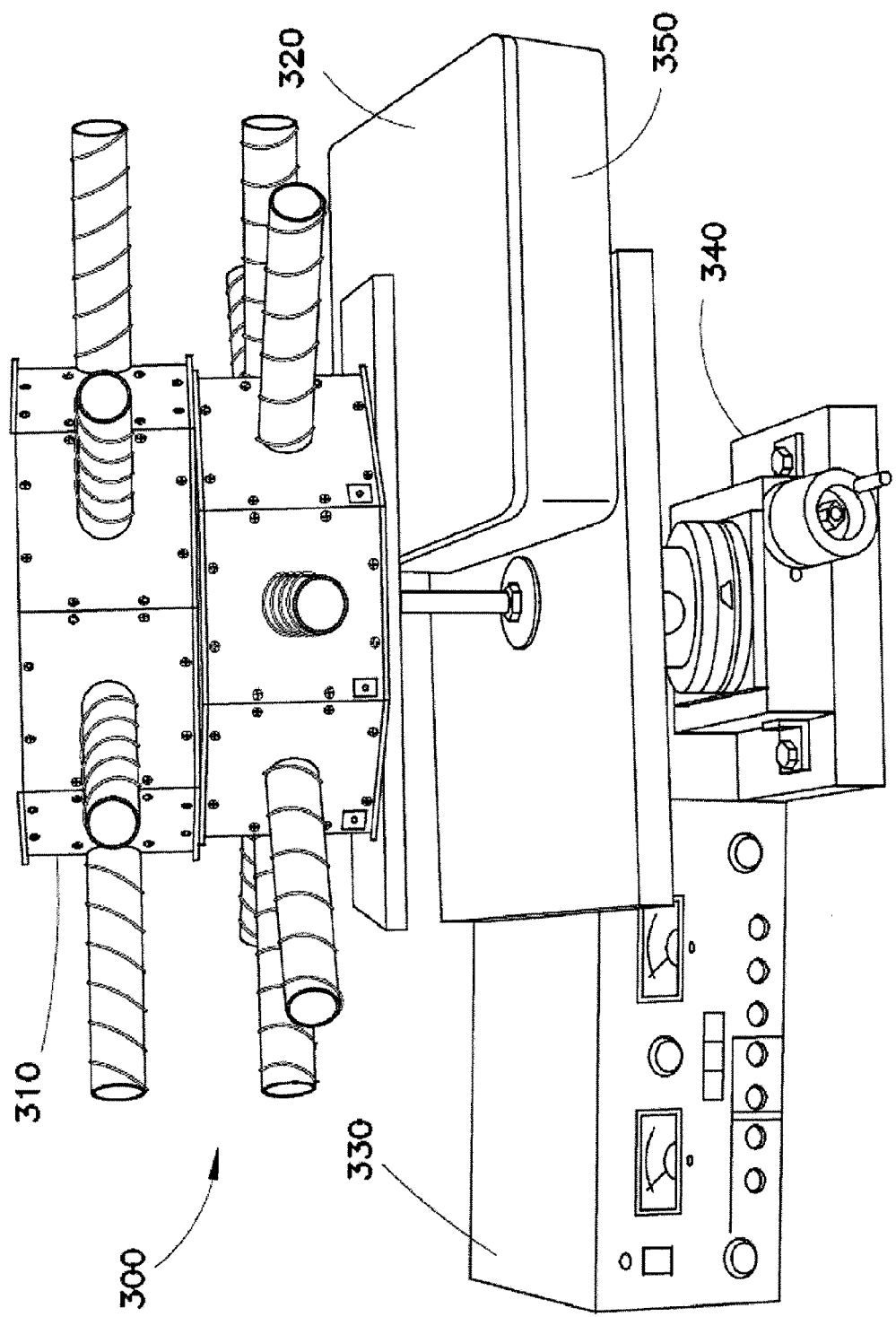
FIG. 3 is a perspective view of a system according to one embodiment of the present invention.

With reference to FIG. 3, there is shown a system 300 according to one embodiment of the present invention. System 300 includes compound directional antenna 310, RF stage enclosure 320, power supply 330, turntable 340, and computer 350. It will be appreciated that system 300, while fully functional, represents a prototype design that could be modified significantly for production of a commercial embodiment and still fall within the scope of the present invention.

Figure 12:
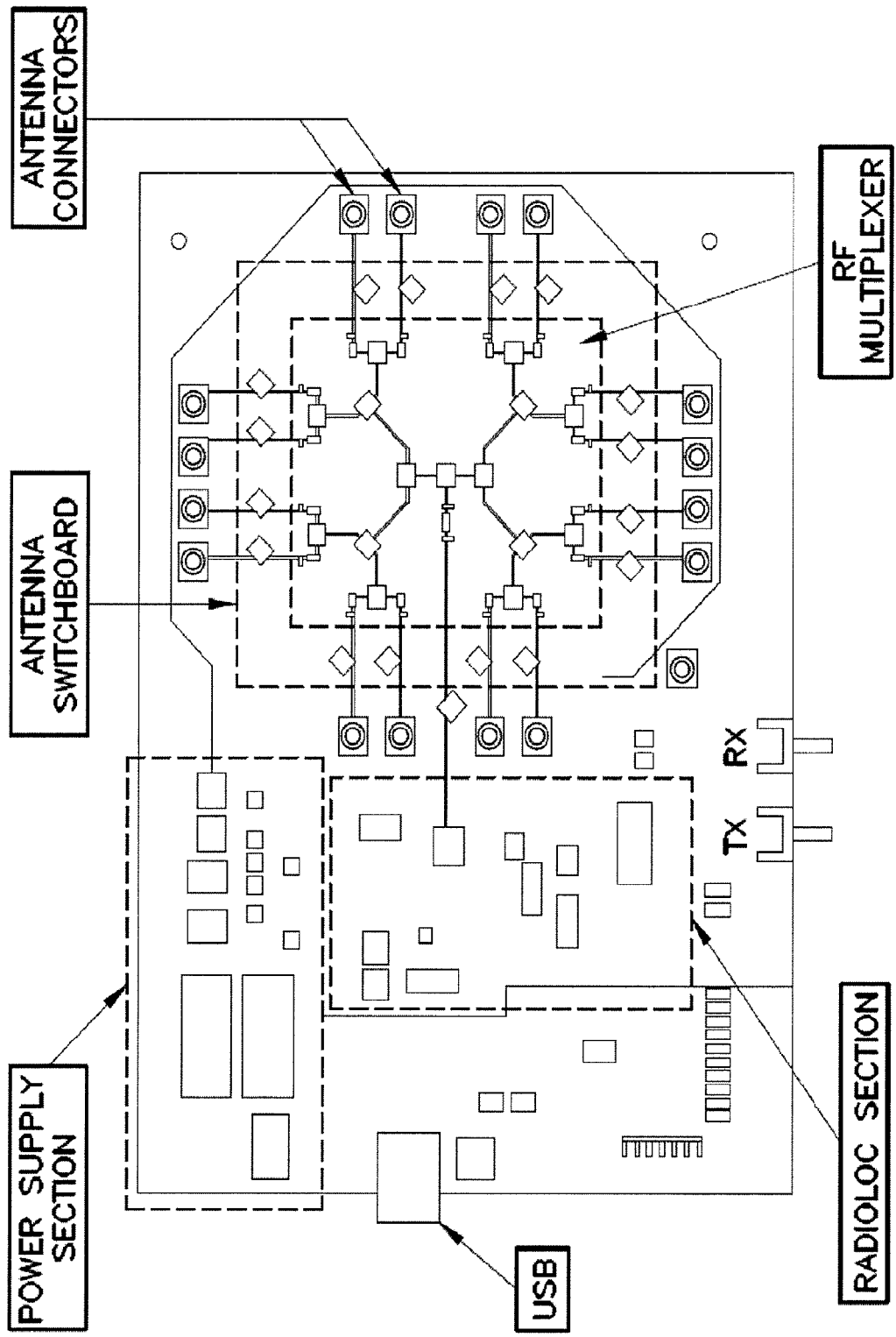
FIG. 12 is a perspective view of a first side of a circuit board for a system according to another embodiment of the present invention.
Figure 13:
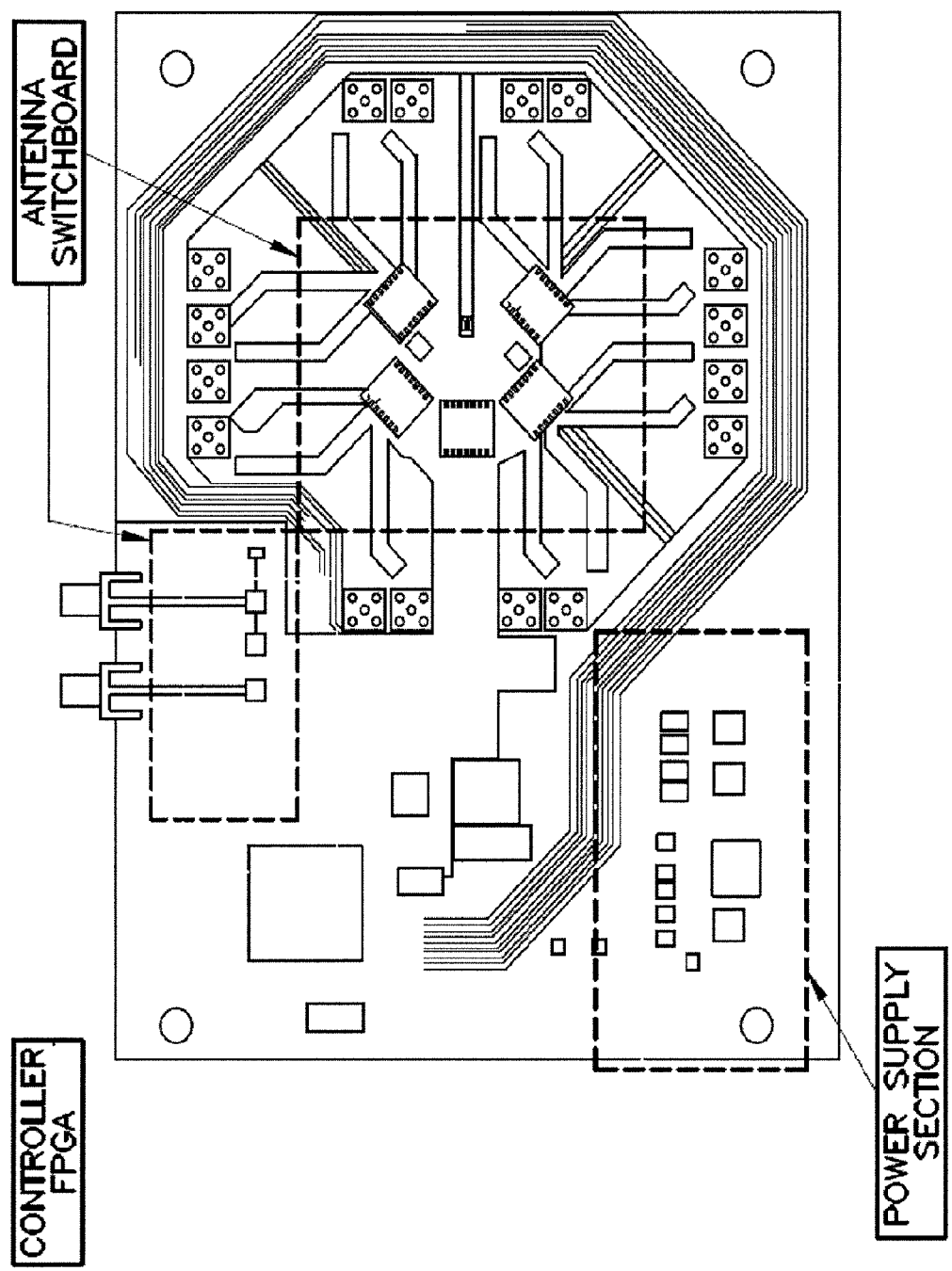
FIG. 13 is a perspective view of a second side of the circuit board of FIG. 12.

For example, circuitry included in computer 350 may be provided directly on the main circuit board as shown in the embodiment of FIGS. 12-13. As shown in FIG. 13, a controller FPGA is provided on the board. As shown in FIG. 12, a power supply, antenna switchboard, antenna connectors, RF multiplexer and radiolocation components are provided on the board.

It should also be noted that turntable 340 was used in experimental testing of system 300 and would be omitted from a commercial embodiment according to the present invention.

Figure 5:
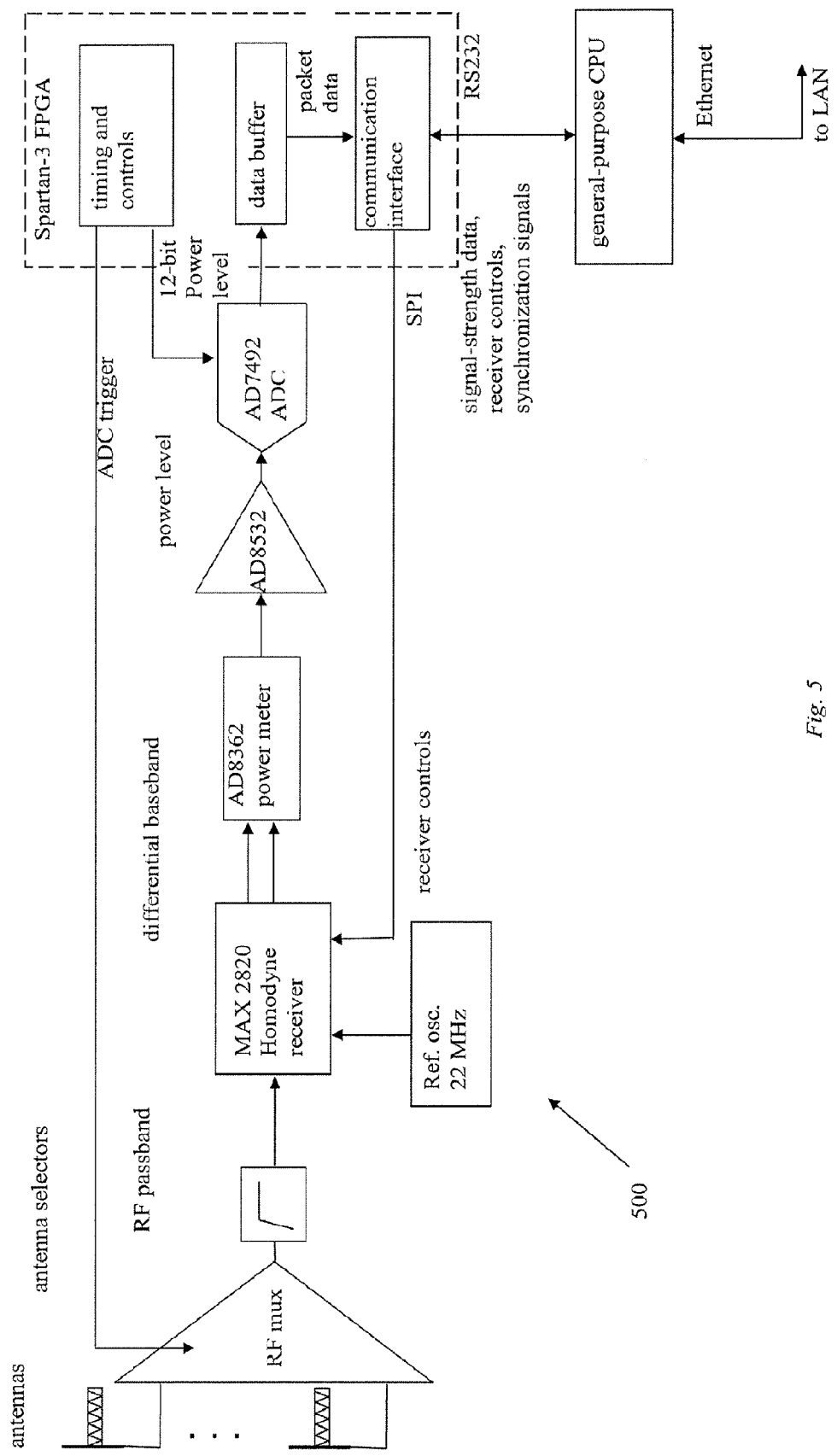
FIG. 5 is a schematic of circuitry according to one embodiment of the present invention.

With reference to FIG. 5 there is shown a radiolocator apparatus 500 according to another embodiment of the present invention. The radiolocation apparatus has a compound stationary antenna, such as those illustrated in FIGS. 1 and 3, which consists of sixteen directional elements, arranged in rings and facing outward at equal angles of (22.5°). Each directional element could be as described above, or could differ. For example, the elements could be 6-turn helices with about a 12 dBi gain, and with their main lobes 90° wide, from null to null. Helices are backed by square ground planes with sides equal to the wavelength of an 802.11b transmission (12.5 cm), and have tuning flaps which are used to match the antenna's impedance to 50Ω. Helical antenna design was chosen for its manufacturing simplicity, and for its indifference to the direction of polarization of the incoming wave. However, a variety of other directional antennas could be used.

The signals from individual helices are passed to the radio receiver in sequence, by means of a RF multiplexer. All sixteen helices are sampled, and their signal strengths measured, in about 130 μs, a time interval within the physical preamble of an 802.11b packet.

The following formulas are used to establish upper and lower limits on sampling frequency when time-multiplexing is used to switch between antenna elements:

Upper limit≥Sampling Frequency [Hz]≤Lower limit;

Lower limit=(# of antenna elements)/(min. carrier duration in one data packet [sec.]);

and

Upper limit=1/(time required to measure and record data from one antenna element).

As illustrated in FIGS. 6, 9, 9A, 9B, 9C, 9D, 9E, 9F, 9G and 10, one embodiment of an RF multiplexer according to the present invention has a binary-tree structure, with four layers of 8, 4, 2 and 1 binary switches, respectively. It is implemented on a 4-layer circuit board, with RF traces configured as 50Ω coplanar waveguides with ground. Extensive via fields surround the RF traces and switches. The switches, parts PE4257 by Peregrine Semiconductor, were chosen for their bandwidth (3 GHz), good isolation (−45 dB when open) and adequate switching speed (<3.5 μs). Thus, as shown in the perpendicular cross-sectional view of FIG. 4, an RF waveguide trace is formed in the top two layers of the multiplexer board. Traces are etched in 0.5 oz copper, and the dielectric is FR-4. Via fields extend on both sides of the waveguide.

Voltage changes on the switch control lines leak into the RF lines through the switches; therefore, the output from the multiplexer is passed through a high-pass L-C-L filter, integrated into the multiplexer board. The cut-off frequency of this filter is about 1.5 GHz, which is adequate to prevent the digital switching noise from propagating into the receiver. The attenuation in each branch of the multiplexer, including the filter, is about 6.5 dB at about 2.4 GHz.

The receiver used is a homodyne MAX2820 receiver by Maxim, designed for 802.11b communication, mounted on a modified evaluation board, and a 22.1 MHz crystal Pierce oscillator supplying its local reference. This receiver has provisions for automatic gain control, but can also be configured for fixed gain. The receiver configuration is performed by means of configuration pins and a synchronous serial port, under the control of a main control circuit.

The strength of the baseband signal is measured with a monolithic power meter chip, AD8362 by Analog Devices. This power meter has a logarithmic characteristic, a good dynamic range (about −50 to +10 dBm), and it completes its measurement cycle within the time slot which the multiplexer allots to a single helix (about 8.3 μs). The power meter AD8362 is a device of the gain-control loop variety, that is, it applies a variable gain to the input, and adjusts the gain until the amplified signal matches an internal reference. The power meter then reports the gain-control voltage as the measure of the input power. In one exemplary embodiment, the critical trade-off was between the measurement time and sensitivity to the modulation ripple. An acceptable compromise was found by adjusting the size of an external capacitor that averages the meter's output over time.

The power meter is followed by a two-stage voltage amplifier (dual op-amp AD8532), which matches the output dynamic range of the meter to the input range of the ADC. The second stage provides a low-impedance source for the ADC's input. Trim potentiometers on the tuner board and the amplifier allow for one-time manual adjustments of the gains and ranges of the apparatus.

The final conversion stage is a 12-bit ADC, part AD7492 made by Analog Devices. This is a successive-approximation ADC with internal reference; it completes one cycle of data acquisition and conversion in about 1 μs. Eight top bits of the ADC's output are used in the subsequent calculations.

Figure 6:
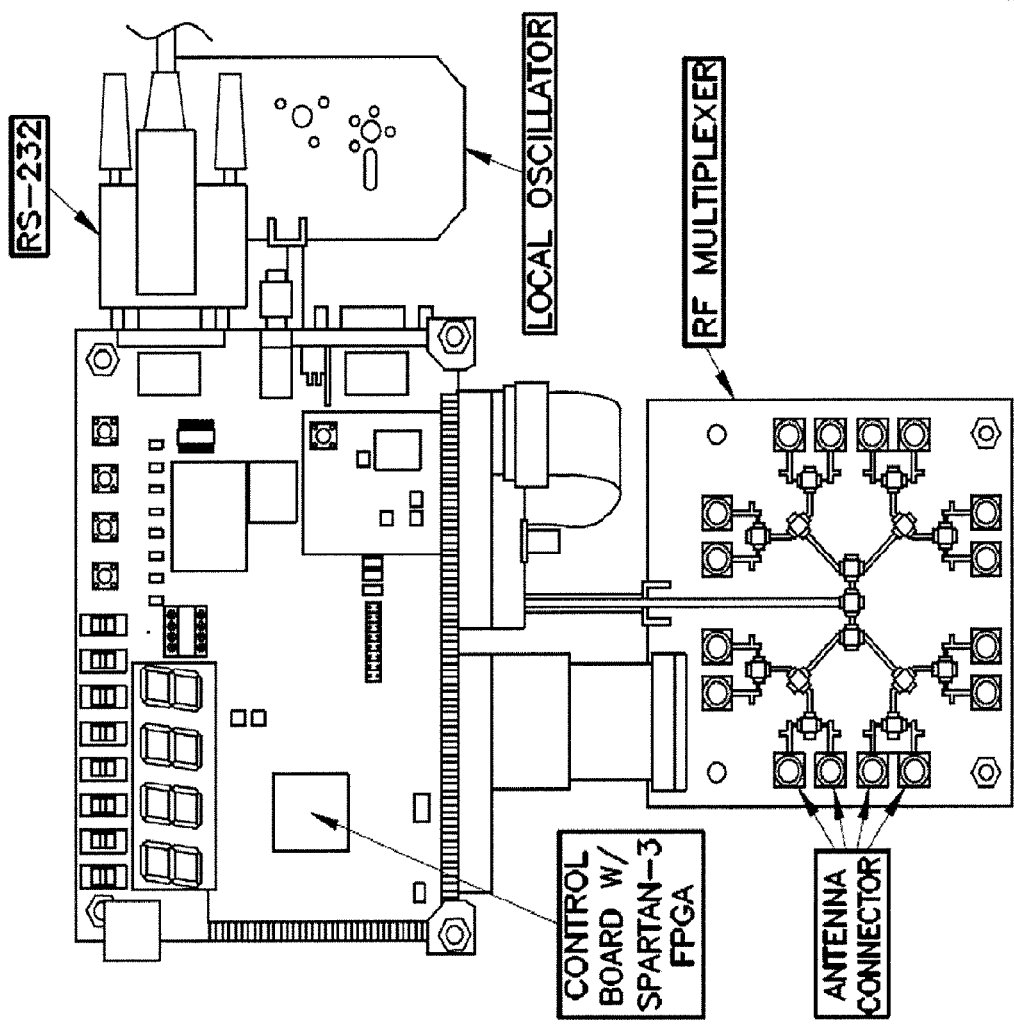
FIG. 6 is a top view of physical circuitry according to one embodiment of the present invention showing a 16-fold RF multiplexer, a control board, and a local oscillator for the receiver circuitry.
Figure 7:
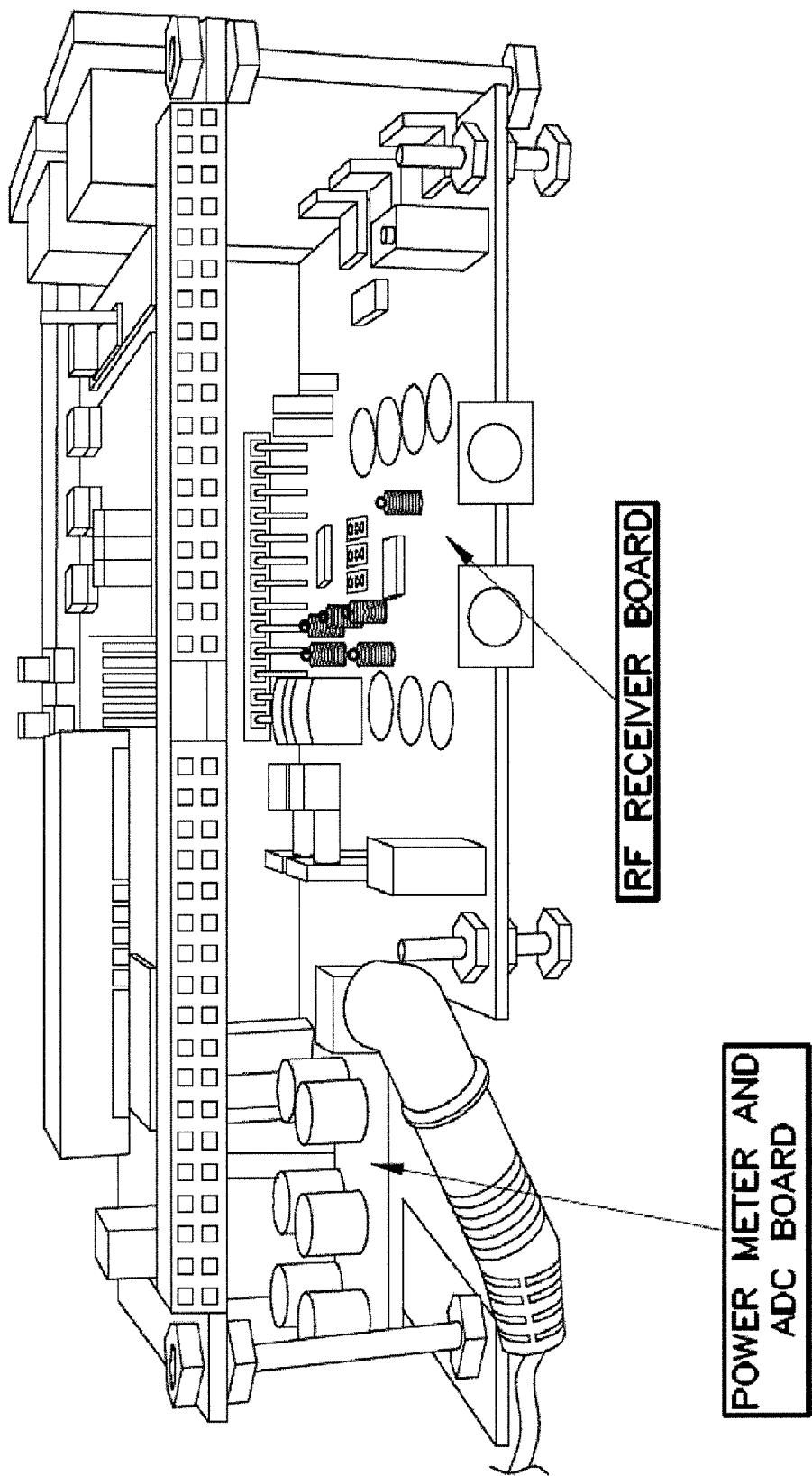
FIG. 7 is a side view of the physical circuitry of FIG. 6 showing the RF receiver and power meter below the control board.

The radiolocator is controlled by an ASIC implemented on the Xilinx' Spartan-3 FPGA. This control circuit provides the timed switching signals for the RF multiplexer, configures the receiver, controls the data-acquisition cycle of the ADC, and collects the signal-strength data. The circuit communicates with the supporting workstation via a RS232 serial link or other link. In addition to the block diagram (FIG. 5) illustrating exemplary embodiment, portions of the actual circuit boards that were constructed are illustrated in FIGS. 6 and 7.

Digitized signal strengths for each incoming wireless packet are assembled into 16-byte data packets by the controlling circuit, and passed to a workstation. From these data, a pattern-matching algorithm calculates the direction from which the wireless packet had arrived.

Various embodiments according to the present invention contemplate an RF multiplexer adapted to receive input from a plurality of directional antennas and to output a multiplexed signal including information of the signal or signals received by each antenna. For example, the RF multiplexer board best illustrated in FIG. 6 includes connectors adapted to be coupled to the 16 input channels of the antenna illustrated in FIG. 1 and to pass information indicating the signal or signals received by the antennas through to its output. This configuration essentially permits sampling of the RF signals from individual antennas. It will be understood that only a preferred embodiment of an RF multiplexer is illustrated and described, and that various other embodiments are contemplated as within the scope of the invention, including RF multiplexers adapted for different frequency ranges and to accommodate other signal characteristics.

Further details of the RF multiplexer board are as follows. The switches use single supply +3.3 V CMOS logic for switching, and use two complementary control signals: high and low in one direction of the switch, low and high in the other. The selection of the active channel is encoded as a four-bit binary number on the control signals, and as the two's complement on the complementary control signals. All control lines have 100 nH chokes on them, to prevent RF leakage into the digital circuitry.

The output from the final fourth layer passes through a high-pass L-C-L filter. Switching voltage changes do leak into the RF lines through the switches themselves, and this filter is designed to block them from leaving the multiplexer. At the RF frequencies and the switching speeds of interest, the cut-off frequency of the filter is about 1.5 GHz.

A 56 µH choke, large enough to block all AC signals present on the board, is placed between the RF and digital grounds. It maintains the two grounds at the same DC potential.

Figure 4:
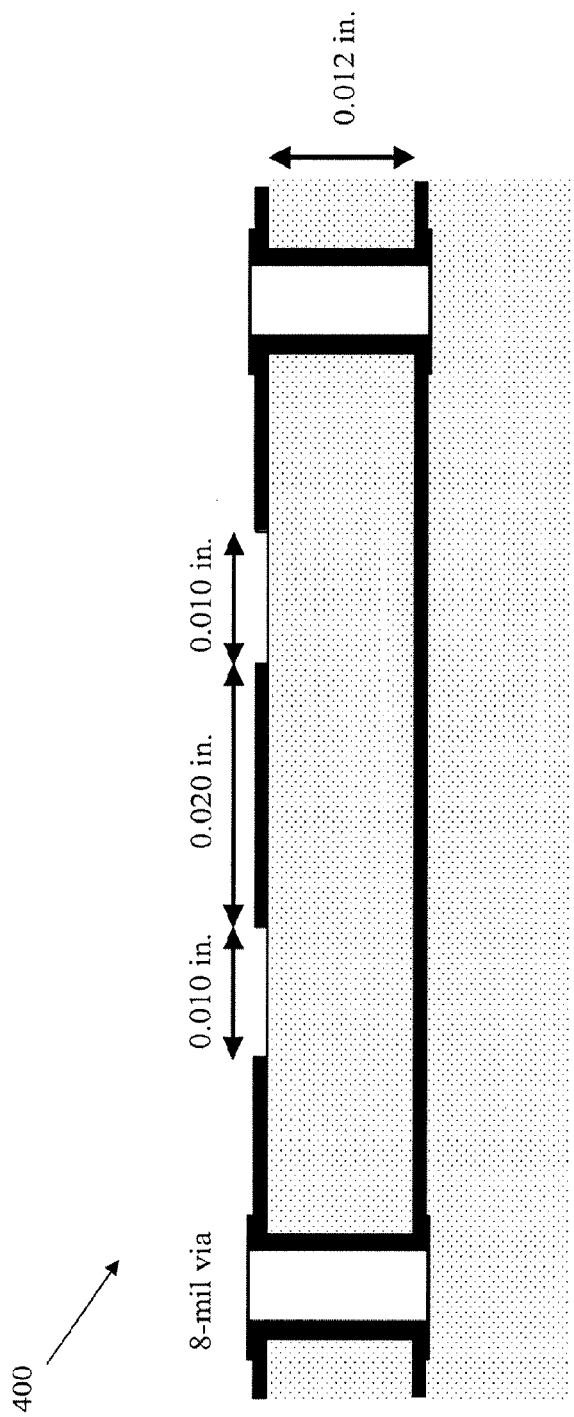
FIG. 4 is a partial side sectional view of an RF waveguide according to one embodiment of the present invention.

According to a preferred embodiment of the present invention, as shown in FIG. 4, the RF circuit board used for the RF multiplexer has four layers: 1) RF signals and reference; 2) RF reference; 3) digital ground plane; 4) digital control signals. The last two layers also carry digital power to the switches.

The RF layers (1 and 2) function in the configuration of the planar waveguide with ground, designed to have the impedance of 50 ohms. RF traces in the first layer are 0.020 in. wide, and the gap between them and the 1st layer reference is 0.010 in. The dielectric between the RF layers is FR4, 0.012 in thick. A field of vias connects the reference planes in the first and second layers, surrounding the switches. The same type of vias also forms fences on both sides of all the RF traces.

The RF layers were laid out and routed manually. The multiplexer is laid out in a branching structure, designed to keep the lengths of all branches the same, and all turns at the same angle, differing only in the turns directions.

The RF switches used are SPDT absorptive switches with 50 ohm impedance and bandwidth of at least 3 GHz. The isolation should be at least 45 dB, and the insertion loss of 1.5 dB per switch is acceptable. The switching time for the present embodiment should be at most 3.5 µs. Parts PE4257, made by Peregrine Semiconductor were used. They are surface-mounted, and are provided with grounding pads, which are connected to the second layer reference plane with grids of vias.

All capacitors have s high resonant frequency (about 3 GHz). The actual capacitors used were RF silicon capacitors made by Vishay Electronics.

The 100 nH chokes on the control lines are placed on the fourth layer, immediately below the RF switches, to reduce the coupling between RF and digital sides of the circuit. Traces and planes on the digital layers (3 and 4) were routed automatically.

The RF connectors are RPSMA plugs on the inputs and an SMA plug on the output. These connectors are chosen for their robustness and small size; equivalent connectors are acceptable. The board was designed with Mentor Graphics' CAD packages Design Capture and Expedition PCB. Let it be understood that the foregoing exemplary embodiment is only one specific example of an RF multiplexer according to the present invention.

Software implementation of the direction-finding method according to the present invention may utilize the fact that all strengths of the signal from one distant source, as registered by the antenna elements (in the illustrated embodiment, substantially identical helices), lie on the lobe pattern of a single helix, that pattern being tilted in the direction of the source. Rotating one lobe pattern until it matches the known pattern yields the direction of the detected source.

The lobe pattern of a typical helix is pre-determined as discussed above, as a result of measurements deemed accurate to 0.5 dB. As stated above, the power meter AD8362 reports the signal strengths on a logarithmic scale (output voltage is proportional to the logarithm of the input power), but the logarithmic base is only approximately that of the decibel scale, 1.259. In order to give the algorithm more flexibility, variation in the logarithm base (b) and the overall scale (s), as well as in the lobe angle ($\theta$), which is the quantity of primary interest, was allowed.

The algorithm includes minimizing a measure of error between known reception characteristics of the antenna elements, and the data obtained by signal-strength measurements. In the illustrated embodiment, this step includes evaluating the integral of the difference between the known single-helix lobe and the lobe obtained by signal-strength measurements over 360 degrees. The latter lobe is rotated by the direction angle $\theta$, scaled by a scaling factor s, and expressed as a power of a log base b; these parameters are varied until the integral of the difference reaches minimum, at which point the source direction $\theta$ has been found.

In one embodiment according to the present invention, the above error minimization is done by using the well-known Nelder-Mead algorithm, which searches for functions' minima in many-dimensional parameter spaces. Minimization algorithms other than Nelder-Mead may be used in other embodiments.

In the case of a three-dimensional arrangement of antenna elements (such as a sphere, or a section of a sphere), the parameter space has an additional angle dimension, and the error measure is an integral over two angles, but the same fundamental procedure applies. Such a three-dimensional arrangement of antenna elements may be used to locate a broadcasting transmitter in a three dimensional space, rather than a two dimensional plane.

In embodiments where non-identical antenna elements are used, the algorithm includes a re-normalization table, to account for the differences in the elements.

With reference to FIGS. 8A and 8B, a simplified block diagram of components seen in FIG. 2 is shown. FIG. 8A depicts a system in accordance with one embodiment of the present invention, including an antenna 300, detector elements 902, 904 and a remote transmitter 900. Transmitter 900 is facing the antenna array 300 at an unknown angle. Reception patterns for each antenna element 902, 904 are known, as previously described. As shown in FIG. 8B, ASIC 212 controls Mux Select lines 224. Signals received by each antenna element 902 through 904 in a time multiplexed manner pass through RF Mux 206 (for simplicity reasons RF splitter 202 is not shown). Output of RF Mux 206 goes through Tuner 210, whose output goes through RF Meter 214, and then to ADC 216. Output of ADC 216, for demonstration purposes only, goes to an algorithmic comparator 914. Reception patterns from ADC 216 are compared with reference signal or signals 908. In the illustrated embodiment, a single reference signal, which is an average of all reception patterns of antenna elements 1 through n, is used as described above. Alternatively, references 910 through 912 are used as references for each individual antenna element as RF Mux 206 accomplishes sampling for that element. Algorithmic comparator 914, via a one or more of error minimization routines, as described above, determines an angle of transmitter 900 with respect to the antenna array 300.

In one embodiment of the present invention the electronics provides an antenna switchboard and a control mechanism, for selection among several modes in which the compound antenna operates. The antenna may operate in one or more of the following modes: radiolocation, omnidirectional reception, single-element (directional) reception, omnidirectional transmission, and/or single-element (directional) transmission.

These modes are incorporated into the device in order to enable enhancements to standard access-point operation. For example, an adaptive access point, equipped with radiolocation, determines the directions of its interlocuting clients (laptops, phones, PDAs etc.), using the radiolocation mode. The access point then assigns the appropriate directional antenna element to each client, using the directional reception and transmission modes. This technique is expected to reduce interference and improve the quality of the wireless service. Those networking operations that are independent of direction are performed in the omnidirectional reception and transmission modes.

Another application of aspects of the present invention includes an access point which distributes its communications over all available directions and frequency channels, automatically and continuously, to improve the range and reduce interference.

Figure 8:
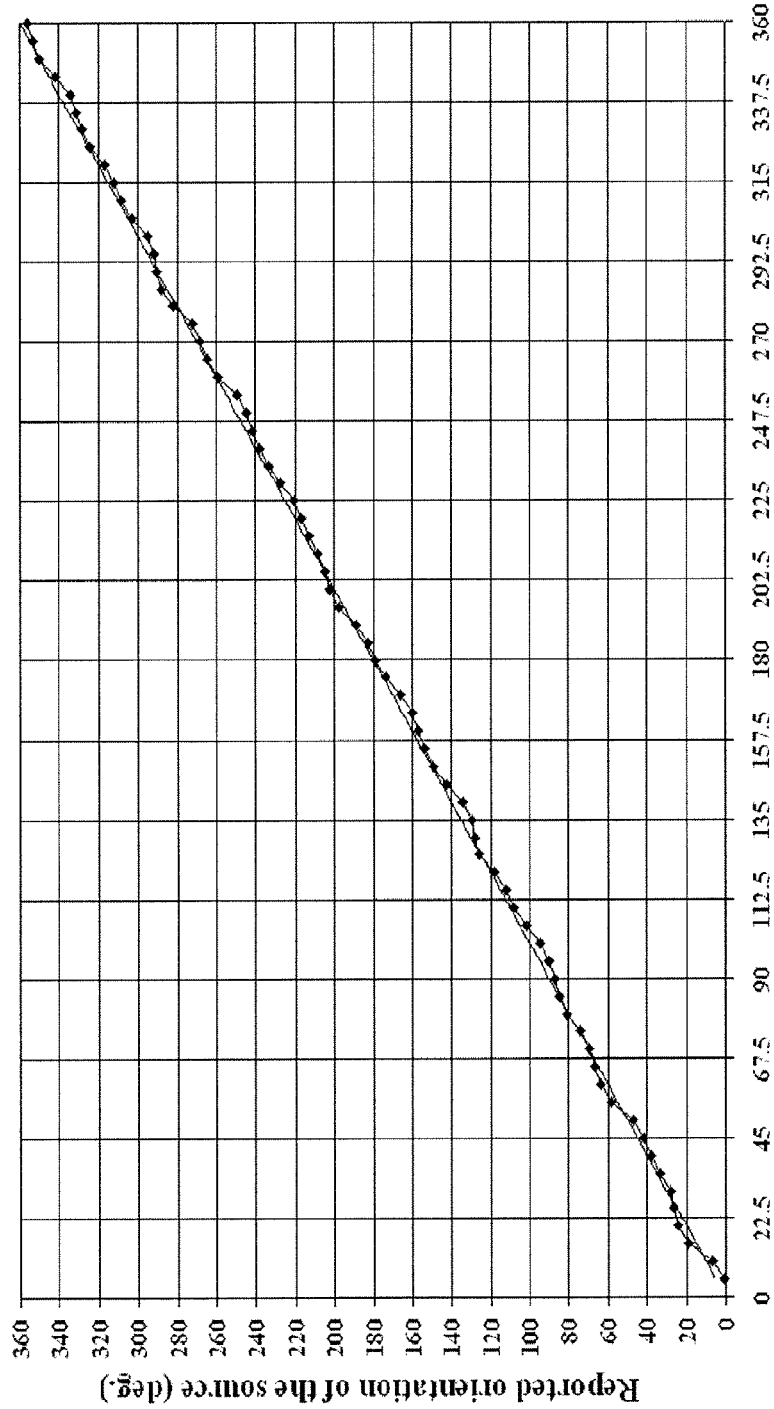
FIG. 8 is a graph illustrating correlation of reported orientation of a source and physical orientation of a source.
Figure 9:
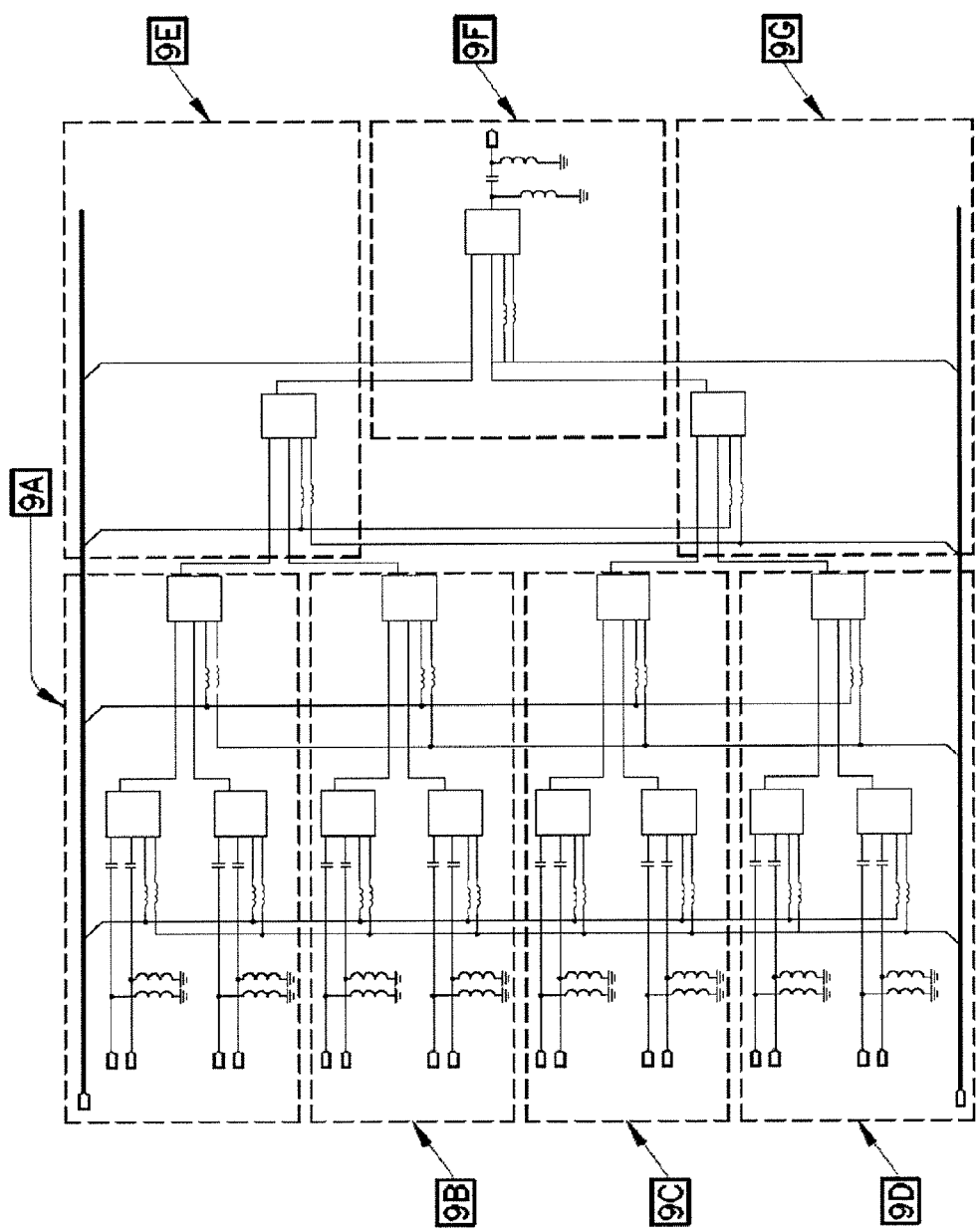
FIG. 9 is a circuit schematic for an RF multiplexer according to one embodiment of the present invention.
Figure 9A:
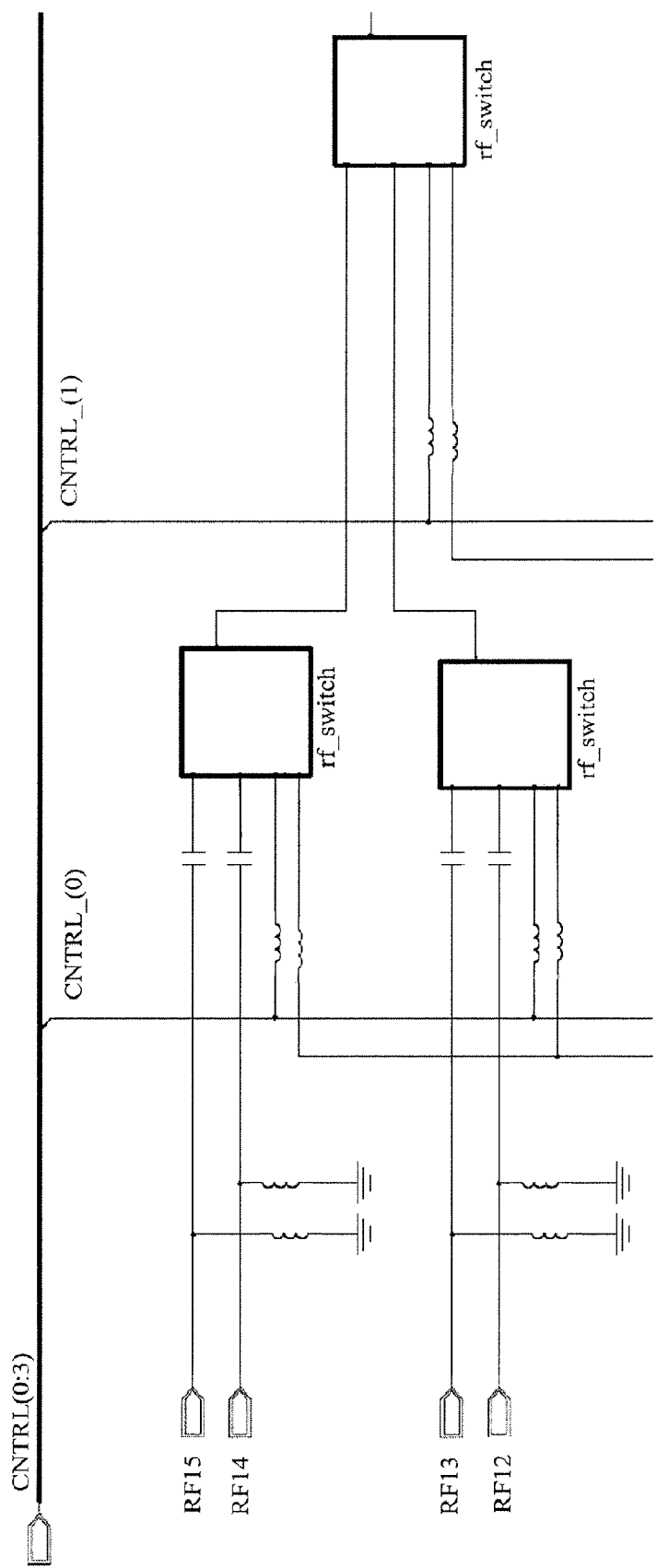
FIG. 9A is a detailed view of a portion of FIG. 9.
Figure 9B:
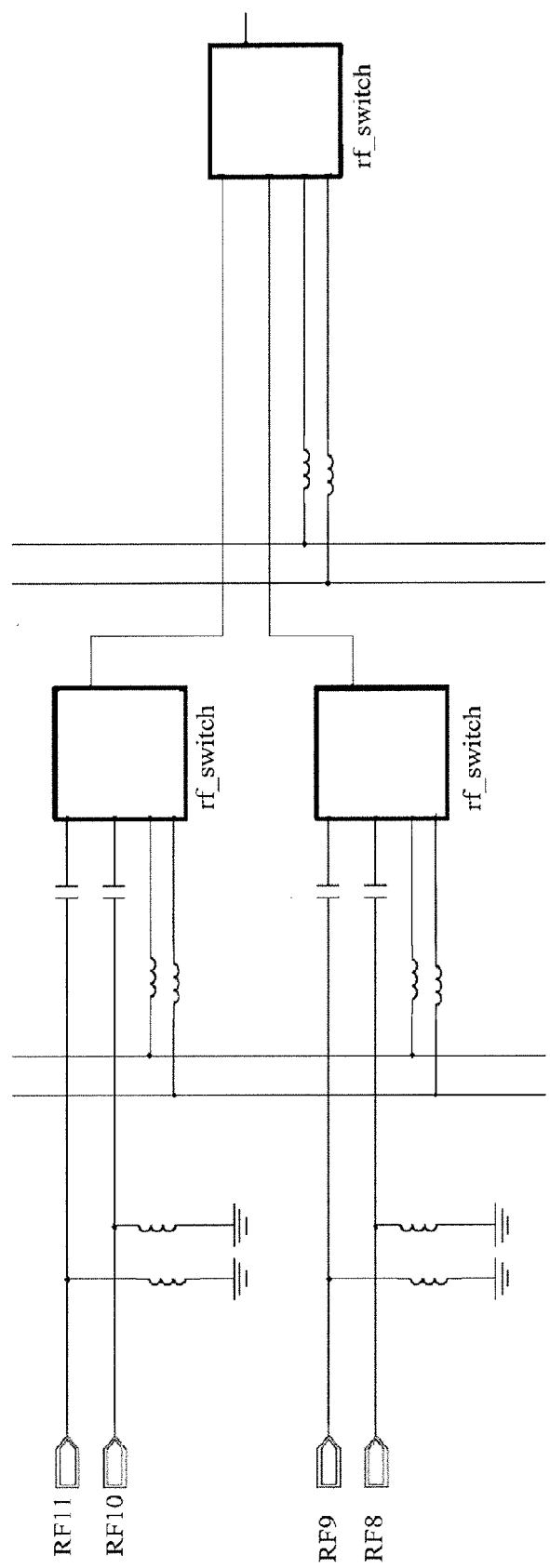
FIG. 9B is a detailed view of a portion of FIG. 9.
Figure 9C:
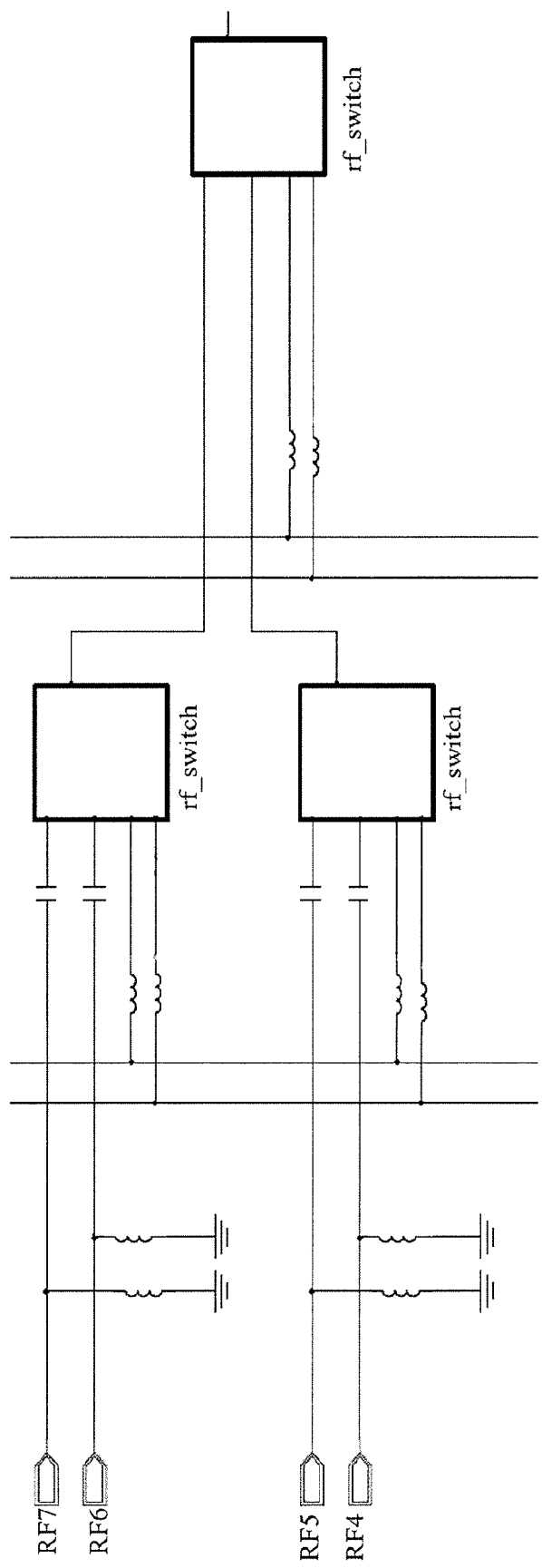
FIG. 9C is a detailed view of a portion of FIG. 9.
Figure 9D:
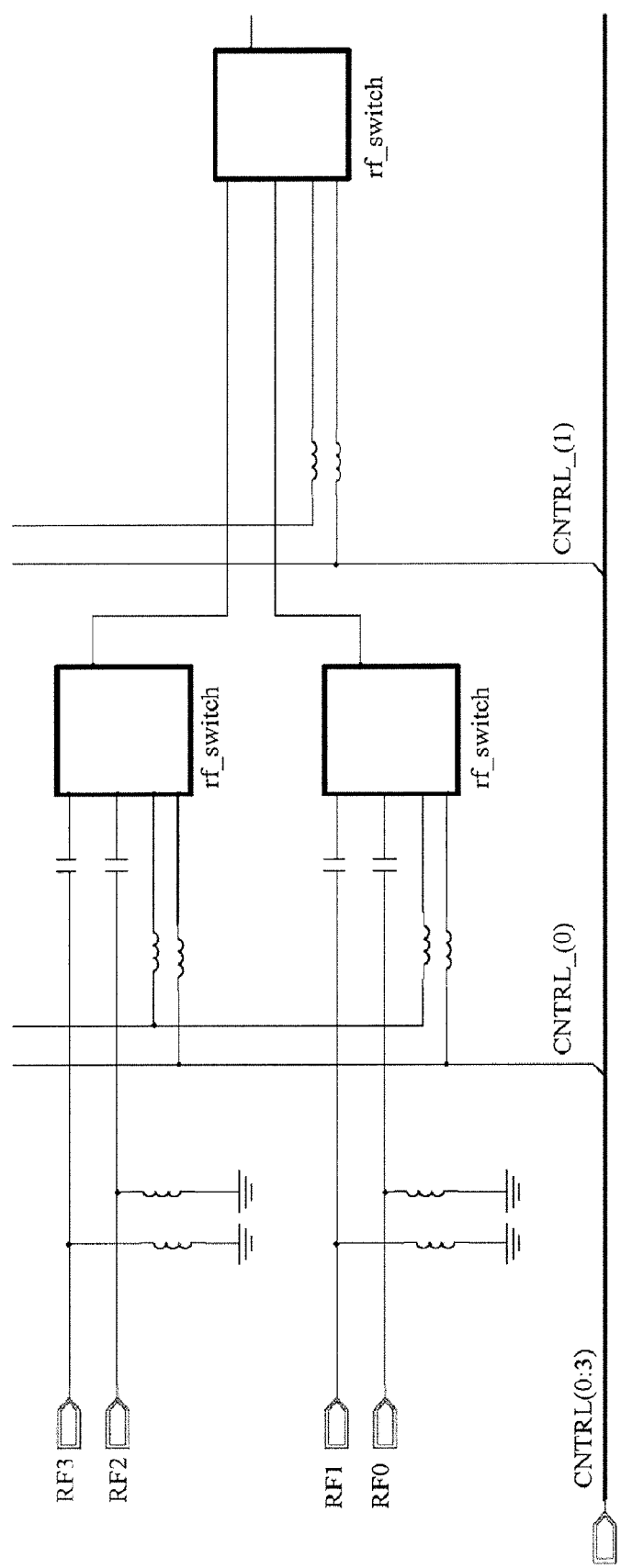
FIG. 9D is a detailed view of a portion of FIG. 9.
Figure 9E:
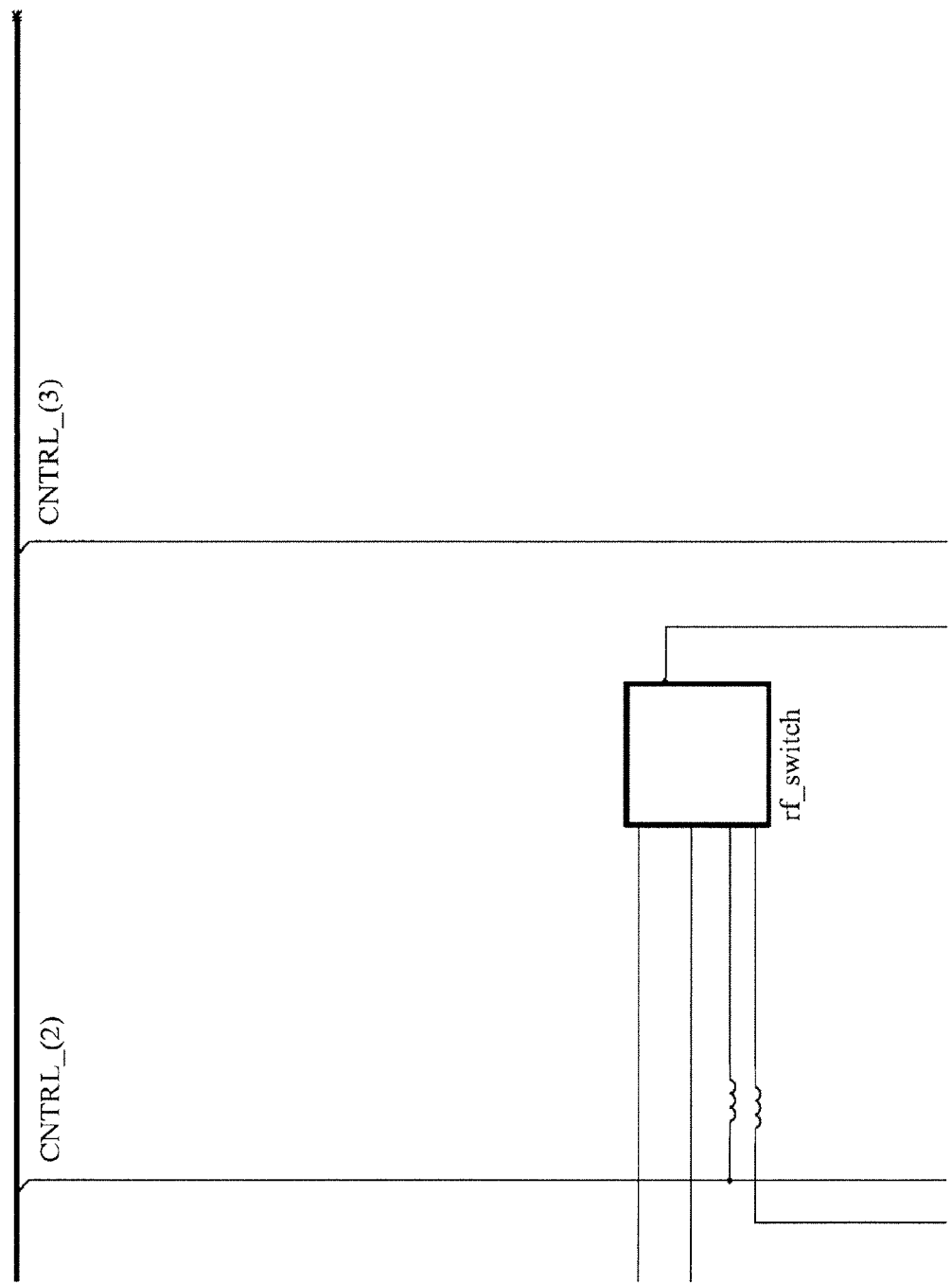
FIG. 9E is a detailed view of a portion of FIG. 9.
Figure 9F:
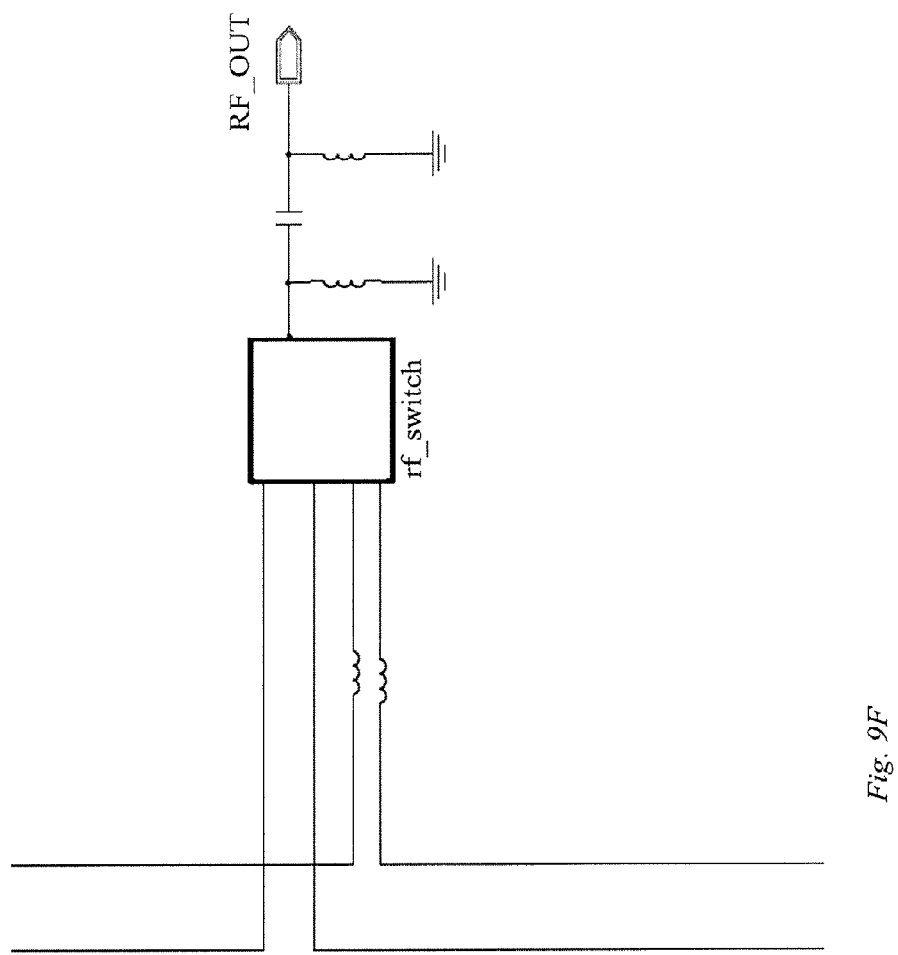
FIG. 9F is a detailed view of a portion of FIG. 9.
Figure 9G:
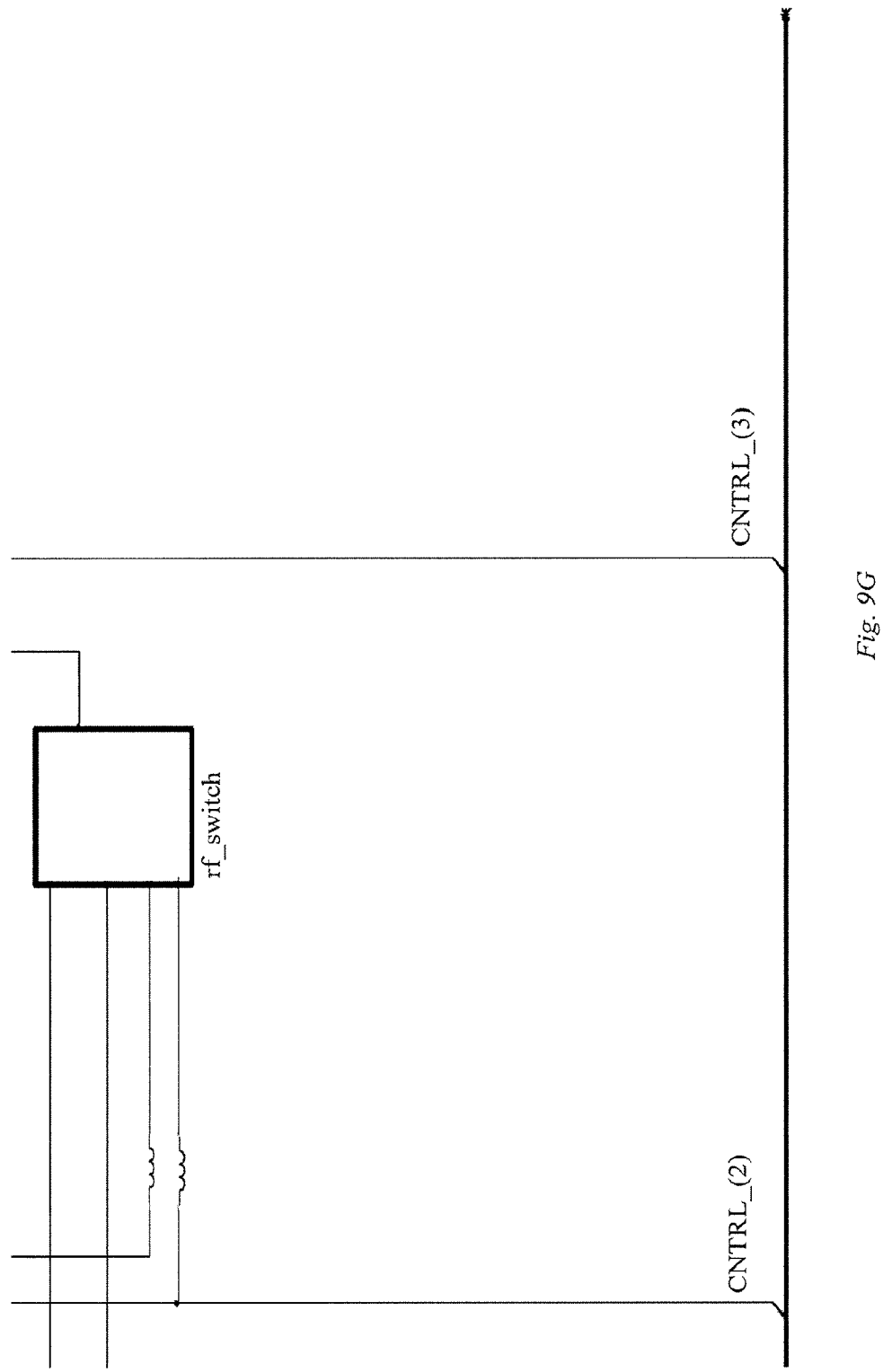
FIG. 9G is a detailed view of a portion of FIG. 9.
Figure 10:
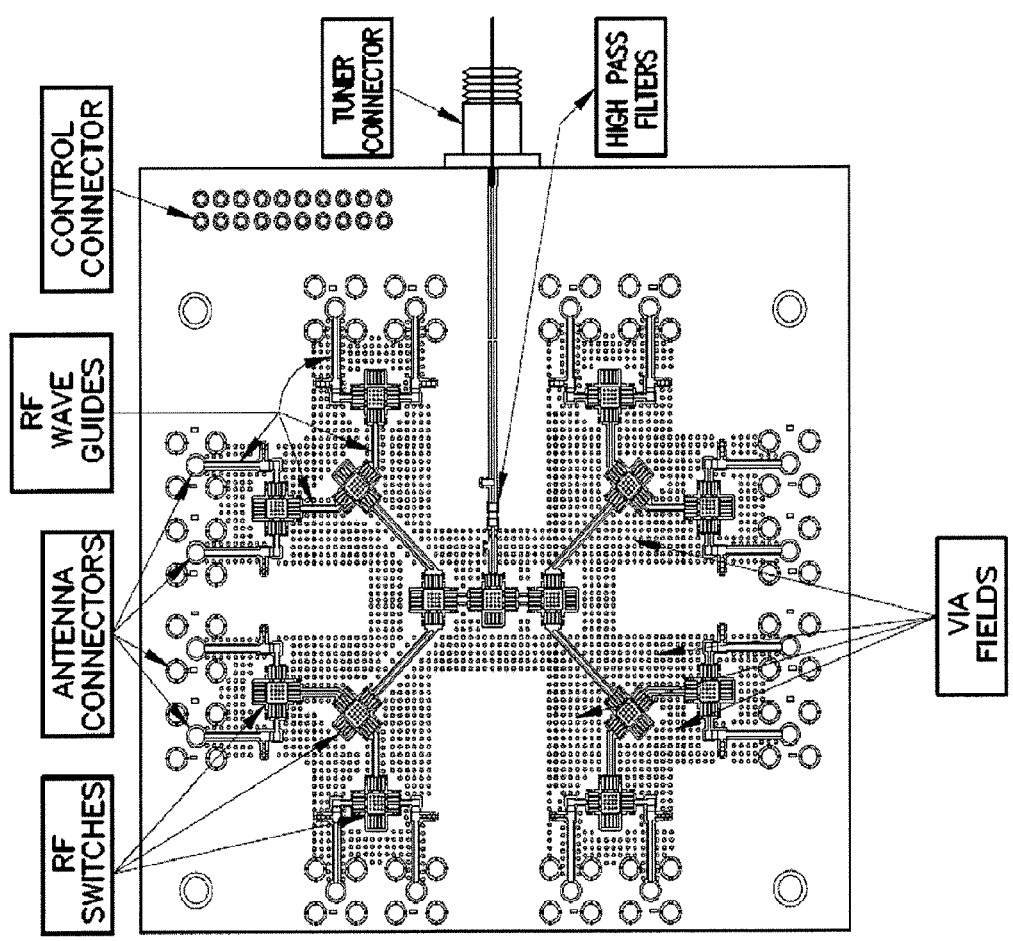
FIG. 10 is a top view of the top layer of a printed circuit board for an RF multiplexer according to one embodiment of the present invention.
Figure 11:
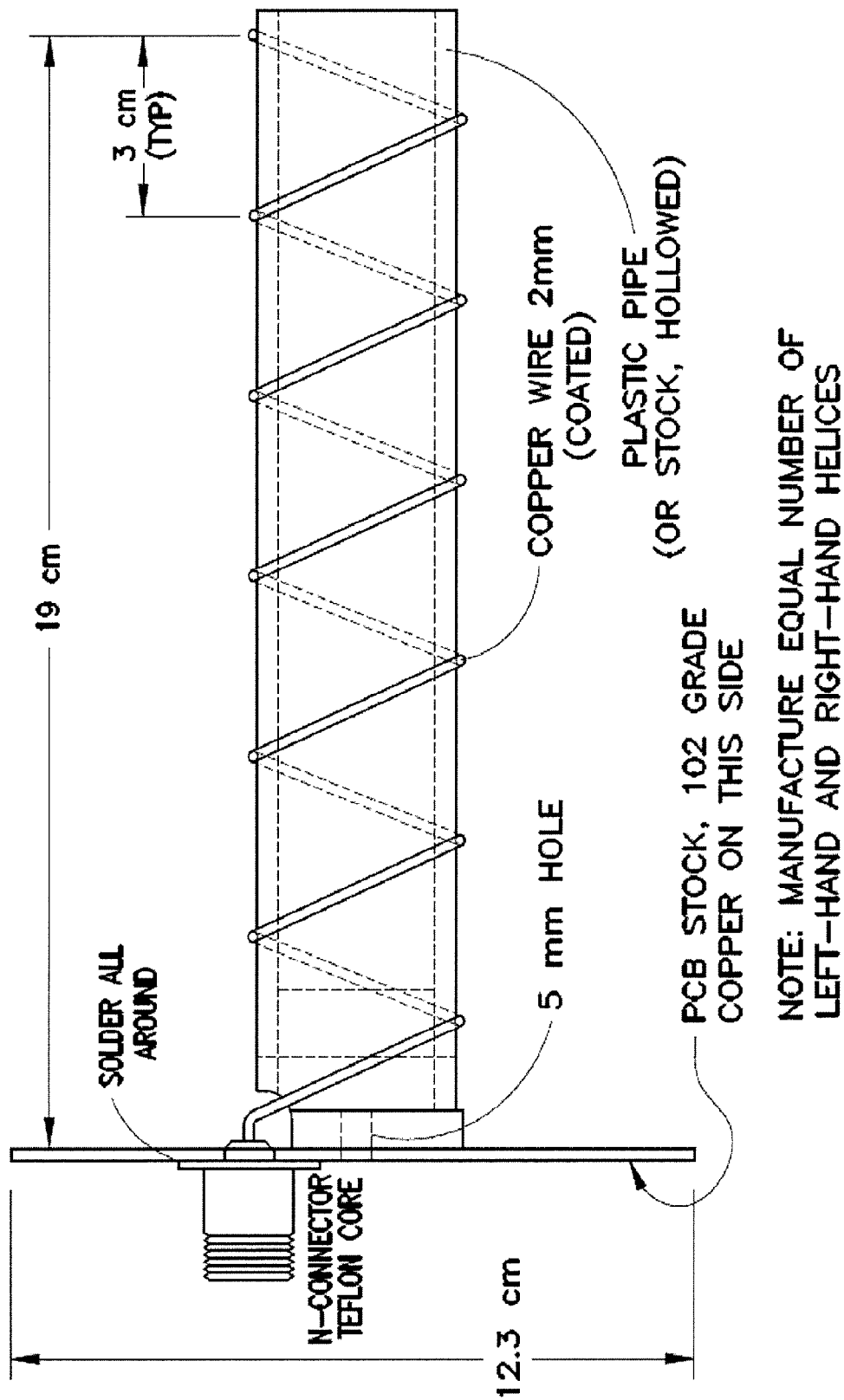
FIG. 11 is a blueprint for a helical directional antenna element according to one embodiment of the present invention.

With reference to FIG. 8 there are shown exemplary test results of one embodiment according to the present invention. The y-axis of the graph shown in FIG. 8 shows reported incoming direction of packets, over the full circle of physical orientations of the source. The test source was a 6 cm dipole, at a distance of 12 ft from the radiolocator's antenna, and the operating frequency is 2.5 GHz. Data points are averages of 100 packets of unmodulated carrier, with σ≈1 degree. The x-axis shows the actual physical orientation of the source around the compound antenna.

According to one embodiment in accordance with the present invention, the front-end system must monitor wireless channels 1, 6 and 11 simultaneously, and collect data from all 16 antenna detectors for every data frame that it receives. Replicating the receiver for all channels and all detectors yields a conceptually simple design and no switching losses, at higher cost and greater routing problems due to sprawl. Time-multiplexing everything to a single receiver yields a compact design with higher losses and complex switching logic.

One embodiment implements a compromise where three receivers are tuned to three channels, and the antenna detector inputs are multiplexed. The 11-Mbps DSSS physical layer has a synchronization preamble of fixed duration of 144 μs. This allows enough time to sample the carrier strength 16 times during the preamble, at the rate of 120 KHz.

Antenna signal multiplexing can be done by building a multiplexer as a tree of GaAs switches, which have a bandwidth greater than 2.4 GHz. The part AW002R2-12 (by Skyworks Solutions) can be used, since a path through four of these 2:1 switches has a loss of 2.8 dB only. Other parts that could be used are AS212-93, a GaAs 4:2 switch by Skyworks, and ADG918, a CMOS 2:1 switch by Analog Devices, and a variety of other parts.

One receiver according to the present invention uses the time-multiplexed signal from the antenna detectors. It does not need the despreading and demodulation stages, nor the interface with the microprocessor; it only needs to be tuned to the desired 22-MHz band and pass the signal to an RMS power detector. Using the Prism chipset as an example, such a receiver can be implemented with parts HFA3624 (downconverter), HFA3524 (IF synthesizer), HFA3724 (tuner) and a few auxiliary chips. Other chipsets could also be used.

One receiver according to the present invention alerts the data-collection stage to an incoming packet, and it also confirms the validity of the packet in real time, so that directional data can be associated with it. The monitoring receiver can not use the same time-multiplexed input as the data collector, since this input will contain asynchronous interruptions due to switching. There are multiple alternatives, for example the receiver could be fed by a separate omnidirectional antenna. This is easy to implement, but the source detection will be limited by the lower gain of this antenna. In another example, the directional detectors feed a preamp/mixer stage, which bypasses the multiplexer and provides a steady signal to the receiver. The monitoring receiver replicates the 802.11 receiver functions of a wireless card; it can include custom features such as the packet alert and the valid-packet confirmation, both in real time.

A range of power detector parts is available from Analog Devices and other manufacturers or through independent design. Exemplary signal strength meters are AD8361 or AD8362, which returns DC voltage proportional to the RMS power of an input wave and has the bandwidth of 2.5 GHz and the input range of up to 30 dB. The meter maybe followed by an op-amp such as AD8532.

Likewise, a wide selection of ADC parts is available from Analog Devices and other manufacturers, for example, an 8-bit, 0.5 MSPS, non-pipelined part such as AD1671 or AD7942. Controlling circuitry is implemented on an XC3520D, a Spartan-3 class FPGA by Xilinx Corp. A USB link is provided by an FT245RL by FTDI Corp.

There are several digital logic functions useful in an exemplary data collection system according to the present invention: a 120 KHz circular counter controlling the RF multiplexer; a buffer for the directional data and packet info; a packet-alert signal to start filling the data buffer; a trigger clock for the ADC; a valid-packet signal to flush data to serial port (or clear the buffer if invalid); and/or a serial port interface.

These functions can be implemented on a programmable chip or chips. A mid-size CPLD from Xilinx could be adapted for this purpose.

Summary packet information (MAC number, node type and other information) and the signal strengths from the 16 receivers are passed to a generic Linux workstation/laptop. A variety of software can be used to extract the bearing angle from signal strengths, and use the existing code for triangulation and graphic display.

As used herein terms relating to properties such as geometries, shapes, sizes, physical configurations, speeds, rates, frequencies, periods, amplitudes, include properties that are substantially or about the same or equal to the properties described unless explicitly indicated to the contrary.

The present invention has been described in detail with reference to certain illustrative embodiments. However, the foregoing description is not intended to limit the scope of protection of the present invention to the precise terms and embodiments set forth herein.

What is claimed is:

1. An apparatus for handling electromagnetic signals, comprising:
a substantially stationary compound antenna array including a plurality of directional antennas having different predetermined reception patterns and extending in different radially outward orientations from a central structure, such that the directional antennas have maximum signal reception in different directions;
an RF multiplexer electrically coupled to the plurality of directional antennas and operable to output multiplexed information indicating the power level of a wireless signal received by the directional antennas, the multiplexed information including information of a different power level of the received signal at two or more of the directional antennas, and indicating a reception pattern; and
an analyzer for determining a transmission direction from which the wireless signal originated responsive to the power levels, via comparing at least one of the predetermined reception patterns with the indicated reception pattern.

2. The apparatus of claim 1 wherein the directional antennas are configured to have overlapping angular ranges.

3. The apparatus of claim 2, wherein the overlapping angular ranges cover 360 degrees.

4. The apparatus of claim 3 wherein the directional antennas are configured to have a lobe pattern tilted in a direction of a transmission direction of a source of a wireless signal.

5. The apparatus of claim 4 wherein the RF multiplexer is configured to sequentially sample a signal received by a plurality of the directional antennas within the time of reception of the wireless signal by the compound antenna.

6. The apparatus of claim 5, wherein the analyzer is configured to determine the transmission direction based on the power level of the wireless signal.

7. The apparatus of claim 6, wherein the analyzer is configured to determine the transmission direction using at least one lobe pattern relating to the directional antennas.

8. A system including at least two apparatuses substantially as described in claim 1 and further including software operable to determine a source location from which the wireless signal originated based upon a triangulation utilizing information of the angular location of the source about the first apparatus and information of the angular location of the source about the second apparatus and information relating to the relative positioning of the two apparatuses.

9. Circuitry for handling wireless signals comprising:
an RF multiplexer including a plurality of RF inputs each adapted to be couplable to one of a plurality of substantially non-rotating directional antennas positioned at intervals about a predetermined detection range;
a filter block adapted to receive an output of the multiplexer;
a receiver block adapted to receive an output of the filter block;
a power sensing block adapted to receive an output of the receiver block; and
an analog to digital conversion block adapted to receive an output of the power sensing block.

10. The circuitry of claim 9 wherein the filter block, the receiver block, the power sensing block, and the analog to digital converter block are implemented in an integrated circuit chipset.

11. The circuitry of claim 9 further comprising a processor adapted to receive an output from the analog to digital converter and programmed to process that output to determine a direction from which at least one wireless signal segment was received relative to a first antenna array.

12. The circuitry of claim 11 wherein the processor is coupled to receive the output of a second analog to digital converter and is programmed to process that output to determine a direction from which at least one wireless transmission segment was received relative to a second antenna array, and the computer is programmed to determine a location of the source of the wireless signal.

13. The circuitry of claim 12 wherein the determining location is based upon a single wireless transmission segment.

14. The circuitry of claim 12 wherein the determining location occurs continuously based upon multiple wireless transmission segments.

15. A method comprising:
receiving a wireless transmission at a plurality of directional antenna units of a non-rotating compound antenna, the plurality of directional antenna units extending in different radially outward orientations from a central structure, and the plurality of directional antenna units further having different predetermined reception patterns and maximum signal reception in different directions;
multiplexing information of a signal relating to the received wireless transmission to an output;
processing the output to determine information indicative of the power received by each antenna unit relating to the signal; and
determining an angular position of a source of the wireless transmission about the compound antenna based upon the power information and antenna reception pattern information of the compound antenna;
wherein the determining step further includes determining the angular position responsive to a difference between a predetermined reception pattern of one of the plurality of directional antenna units and a reception pattern indicated by the power information.

16. The method of claim 15 further comprising:
receiving a wireless transmission at at least one antenna unit of a second non-rotating compound antenna;
multiplexing information of a signal relating to the wireless transmission received by at least one second antenna unit to a second output;
processing the second output to determine information indicative of the power received by each of the second antenna units relating to the signal; and
determining a second angular position of a source of the wireless transmission about the second compound antenna based upon the second power information.

17. The method of claim 16 further comprising determining the location of a source transmitting to a wireless receiver based upon the first angular position and the second angular position.

18. A method comprising determining the location of an unauthorized transmitter to a wireless network utilizing the method of claim 17.

19. A method comprising determining the location of an authorized transmitter to a wireless network utilizing the method of claim 17 and further communicating to the authorized transmitter using a wireless network transmitter determined to be best positioned for transmission to the authorized user based upon the location of the authorized user.

20. The method of claim 19 further comprising providing enhanced directional transmission to the authorized user by only activating directional antenna units in the determined direction of the authorized user.

21. The method comprising tracking the movement of a transmitter to a wireless network by successively repeating the method of claim 17.

22. The method of claim 16 wherein the multiplexing is time-based multiplexing.

23. An apparatus comprising:
a non-rotating compound antenna array including a plurality of directional antennas extending in different radially outward orientations from a central structure, each directional antenna having a reception pattern and a different direction of maximum signal strength reception;
an RF multiplexer electrically coupled to the plurality of directional antennas and operable to output multiplexed information, the multiplexed information indicating a signal strength of at least one segment of a wireless signal received by at least some of the directional antennas and including information indicating a different signal strength received by at least two of the directional antennas; and
an analyzer for determining information indicating a transmission direction about the compound antenna from which the wireless signal originated at least in part by matching a first reception pattern indicated by the signal strength information with a second reception pattern relating to the directional antennas.

* * * * *